US012551928B2

(12) United States Patent
DeMay et al.

(10) Patent No.: US 12,551,928 B2
(45) **Date of Patent: *Feb. 17, 2026**

(54) INJECTION MOLDED SCREENING APPARATUSES AND METHODS

(71) Applicant: Derrick Corporation, Buffalo, NY (US)

(72) Inventors: Alex DeMay, Amherst, NY (US); Kurt Stodolka, Cheektowaga, NY (US)

(73) Assignee: Derrick Corporation, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,873

(22) Filed: Sep. 30, 2024

(65) Prior Publication Data

US 2025/0018431 A1 Jan. 16, 2025

Related U.S. Application Data

(63) Continuation of application No. 18/448,488, filed on Aug. 11, 2023, now Pat. No. 12,172,191, which is a continuation of application No. 18/131,564, filed on Apr. 6, 2023, now Pat. No. 11,819,884.

(60) Provisional application No. 63/328,228, filed on Apr. 6, 2022.

(51) Int. Cl.
*B07B 1/46* (2006.01)

(52) U.S. Cl.
CPC .......... *B07B 1/4645* (2013.01); *B07B 1/4618* (2013.01)

(58) Field of Classification Search
CPC ............................ B07B 1/4618; B07B 1/4645
USPC .......................................................... 209/392
See application file for complete search history.

(56) References Cited

U.S. PATENT DOCUMENTS

| | | | | |
|---|---|---|---|---|
| 4,190,527 A | | 2/1980 | Spiller | |
| 4,752,512 A | * | 6/1988 | Wolff | B07B 1/4645 156/304.6 |
| 6,220,448 B1 | | 4/2001 | Bakula | |
| 6,443,310 B1 | | 9/2002 | Schulte, Jr. et al. | |
| 6,736,271 B1 | | 5/2004 | Hall | |
| 11,819,884 B2 | * | 11/2023 | DeMay | B07B 1/4618 |
| 12,172,191 B2 | * | 12/2024 | DeMay | B07B 1/4618 |

(Continued)

FOREIGN PATENT DOCUMENTS

| | | | | |
|---|---|---|---|---|
| AU | 2485984 | | 9/1984 | |
| CA | 3130119 A1 | * | 6/2019 | B07B 1/4618 |

(Continued)

OTHER PUBLICATIONS

Extended European Search Report issued in App. No. EP242161966, dated Jun. 13, 2025, 13 pages.

(Continued)

*Primary Examiner* — Terrell H Matthews

(74) *Attorney, Agent, or Firm* — FisherBroyles, LLP; Jason P. Mueller

(57) ABSTRACT

A screen assembly is formed by attaching side edges of a plurality of screen elements to each other. Reinforcing fibers may be embedded in the material of selected screen elements. The reinforcing fibers extend in a direction in which the screen assembly will be tensioned to secure the screen assembly to a screening machine. Hook strips may be attached to ends or sides of the screen assembly to facilitate mounting the screen assembly to a screening machine.

32 Claims, 27 Drawing Sheets

(56) References Cited

U.S. PATENT DOCUMENTS

| | | | | |
|---|---|---|---|---|
| 2002/0033358 | A1 | 3/2002 | Bakula | |
| 2002/0088531 | A1 | 7/2002 | Cook | |
| 2013/0337218 | A1 | 12/2013 | Liu | |
| 2014/0262978 | A1* | 9/2014 | Wojciechowski | B07B 1/4663 209/397 |
| 2021/0229131 | A1* | 7/2021 | Wojciechowski | B07B 1/4645 |

FOREIGN PATENT DOCUMENTS

| | | | | | |
|---|---|---|---|---|---|
| CA | 3032710 | C | * | 2/2021 | B07B 1/46 |
| CL | 202403012 | | | 2/2025 | |
| CN | 1615185 | | | 5/2005 | |
| CN | 201441977 | | | 4/2010 | |
| CN | 106216239 | A | | 12/2016 | |
| CN | 106255556 | A | | 12/2016 | |
| DE | 6915606 | U | * | 4/1969 | |
| EA | 202091473 | A1 | | 9/2020 | |
| GB | 1289537 | A | | 9/1972 | |
| GB | 1458932 | A | | 12/1976 | |
| RU | 2543393 | | | 2/2015 | |
| RU | 2543393 | C2 | | 2/2015 | |
| WO | 2011133238 | A1 | | 10/2011 | |
| WO | WO-2014149516 | A1 | * | 9/2014 | B07B 1/4663 |
| WO | 2015168516 | A2 | | 11/2015 | |
| WO | 2023196492 | | | 10/2023 | |
| WO | 2023196492 | A1 | | 10/2023 | |

OTHER PUBLICATIONS

Extended European Search Report issued in App. No. EP23785378, dated Jul. 28, 2025, 8 pages.

International Search Report and Written Opinion issued in App. No. PCT/US2023/017723, mailing date Jul. 20, 2023, 15 pages.

* cited by examiner

INJECTION MOLDED SCREENING APPARATUSES AND METHODS

CROSS-REFERENCE TO RELATED APPLICATIONS

This application is a continuation of U.S. application Ser. No. 18/448,488, filed Aug. 11, 2023, which is a continuation of U.S. application Ser. No. 18/131,564, filed Apr. 6, 2023, which claims priority to U.S. Provisional Application No. 63/328,228, filed Apr. 6, 2022, the contents of both of which are incorporated herein by reference and the priority of which is hereby claimed.

FIELD

The present disclosure relates generally to material screening. More particularly, the present disclosure relates to screening members, screening assemblies, methods for fabricating screening members and assemblies and methods for screening materials.

BACKGROUND

Material screening includes the use of vibratory screening machines. Vibratory screening machines provide the capability to excite an installed screen such that materials placed upon the screen may be separated to a desired level. Oversized materials are separated from undersized materials. Over time, screens wear and require replacement. As such, screens are designed to be replaceable.

Replacement screen assemblies must be securely fastened to a vibratory screening machine and are subjected to large vibratory forces. Replacement screens may be attached to a vibratory screening machine by tensioning members, compression members or clamping members.

In the past, screen assemblies were made of metal and/or a thermoset polymer. The material and configuration of the screen assemblies are specific to screening applications. For example, due to their relative durability and capacity for fine screening, metal screens are frequently used for wet applications in the oil and gas industry. Traditional thermoset polymer type screens also can be used in wet and dry screening applications.

Fabricating thermoset polymer type screens is relatively complicated, time consuming and prone to errors. Typical thermoset type polymer screens that are used with vibratory screening machines are fabricated by combining separate liquids (e.g., polyester, polyether and a curative) and then filling a screen mold with the mixed liquids. The liquids chemically react and cure over a period of time in a mold. Once cured, the screen is then removed from the mold. The cure time in the mold is typically measured in hours. In some instances, it can take ten hours or more before the screen is sufficiently cured to be removed from the mold.

When one wishes to create a screen that has both fine openings and a relatively large open screening area, it is necessary to make the screen surface elements quite fine. The screen surface elements are the solid parts of the screen between the openings. In some instances, it is necessary to fabricate the screens such that the screen surface elements have thickness or width dimensions as small as 40-100 microns. This means the passages in the mold likewise must have a width or diameter of 40-100 microns. It can be difficult and time consuming to ensure that the mixed liquids used to form the screen completely fills all the very fine voids and passageways of the mold. Doing so may require special movements, high pressures and complicated handling procedures.

All too often, the liquid used to form the screen does not reach and fill all the cavities in the mold. One flaw in the resulting screen (e.g., a hole, i.e., a place where the liquid did not reach) will ruin the entire screen. Also, one small rip or tear that is caused when the screen is removed from the mold also will ruin the screen. This is particularly problematic when one is making a relatively large screen (e.g., two feet by three feet or larger), and a single small imperfection ruins the entire screen.

When one considers the manufacturing process used to make thermoset screens, it is the cure time that takes the longest and that is typically the limiting factor in terms of rate of production. The cure time is similar whether one is making a small screen or a large screen. For that reason, it makes little or no sense to make multiple small thermoset screen and then spend additional time joining the small thermoset screens together to make a larger thermoset screen assembly. Instead, it make sense to simply manufacture thermoset screens in the actual desired size, as this results in the fastest production rate.

In addition, conventional cast thermoset plastics cannot be melted or reshaped after they are cured. For that reason, it is difficult to join together multiple smaller thermoset screens to make a larger thermoset screen assembly. This is another reason why those of skill in the art tend to simply make thermoset screen in the desired size, rather than fabricating multiple smaller thermoset screens and then assembling them together to make a larger thermoset screen assembly.

Thermoset polymer screens are relatively flexible and are often secured to a vibratory screening machine using tensioning members that pull the side edges of the thermoset polymer screen away from each other and secure a bottom surface of the thermoset polymer screen against a surface of a vibratory screening machine. To prevent deformation when being tensioned, thermoset polymer assemblies may be molded with aramid fibers that run in the tensioning direction (see, e.g., U.S. Pat. No. 4,819,809). If a compression force were applied to the side edges of a typical thermoset polymer screen. it likely would buckle or crimp, thereby rendering the screening surface relatively ineffective. However, it may be possible to attach a thermoset polymer screen to a rigid plate or subassembly that allows the thermoset polymer screen to be used in compression mounted applications.

In contrast to thermoset polymer screens, metal screens are rigid and may be compressed or tensioned onto a vibratory screening machine. Metal screen assemblies are often fabricated from multiple metal components. The manufacture of metal screen assemblies typically includes fabricating a screening material, typically using multiple layers of a woven wire mesh. In some instances, such as where the screen assembly will be used in a compression mounted application, the manufacturing process can further include fabricating an apertured metal backing plate and bonding the screening material to apertured metal backing plate. The layers of wire cloth may be finely woven with openings in the range of approximately 30 microns to approximately 4000 microns. The entire screening surface of conventional metal assemblies is normally a relatively uniform flat configuration or a relatively uniform corrugated configuration.

Critical to screening performance of screen assemblies (thermoset polymer assemblies and metal type assemblies)

for vibratory screening machines are the size of the openings in the screening surface, structural stability and durability of the screening surface, structural stability of the entire unit, chemical properties of the components of the unit and ability of the unit to perform in various temperatures and environments. Drawbacks to conventional metal assemblies include lack of structural stability and durability of the screening surface formed by the woven wire mesh layers, blinding (plugging of screening openings by particles) of the screening surface, weight of the overall structure, time and cost associated with the fabrication or purchase of each of the component members, and assembly time and costs. Because wire cloth is often outsourced by screen manufacturers, and is frequently purchased from weavers or wholesalers, quality control can be extremely difficult and there are frequently problems with wire cloth. Flawed wire cloth may result in screen performance problems and constant monitoring and testing is required.

One of the biggest problems with conventional metal assemblies is blinding. A new metal screen may initially have a relatively large open screening area but over time, as the screen is exposed to particles, screening openings plug (i.e., blind) and the open screening area, and effectiveness of the screen itself, is reduced relatively quickly. For example, a 140 mesh screen assembly (having three layers of screen cloth) may have an initial open screening area of 20-24%. As the screen is used, however, the open screening area may be reduced by 50% or more.

Conventional metal screen assemblies also lose large amounts of open screening area because of their construction, which includes adhesives, backing plates, plastic sheets bonding layers of wire cloth together, etc.

Another major problem with conventional metal assemblies is screen life. Conventional metal assemblies don't typically fail because they get worn down but instead fail due to fatigue. That is, the wires of the woven wire cloth often actually break due to the up and down motion they are subject to during vibratory loading.

Drawbacks to conventional thermoset polymer screens also include lack of structural stability and durability. Additional drawbacks include inability to withstand compression type loading and inability to withstand high temperatures (e.g., typically a thermoset polymer type screen will begin to fail or experience performance problems at temperatures above 130° F., especially screens with fine openings, e.g., approximately 43 microns to approximately 100 microns). Further, as discussed above, fabrication is complicated, time consuming and prone to errors. Also, the molds used to fabricate thermoset polymer screens are expensive and any flaw or the slightest damage thereto will ruin the entire screen and require replacement, which may result in costly downtime in the manufacturing process.

Another drawback to both conventional metal and thermoset polymer screens is the limitation of screen surface configurations that are available. Existing screening surfaces are fabricated with relatively uniform opening sizes throughout and a relatively uniform surface configuration throughout, whether the screening surface is flat or undulating.

There is a need for versatile and improved screening members, screening assemblies, methods for fabricating screening members and assemblies and methods for screening materials for vibratory screening machines that incorporate the use of injection molded materials (e.g., thermoplastics) having improved mechanical and chemical properties.

DETAILED DESCRIPTION

Figure 1A:
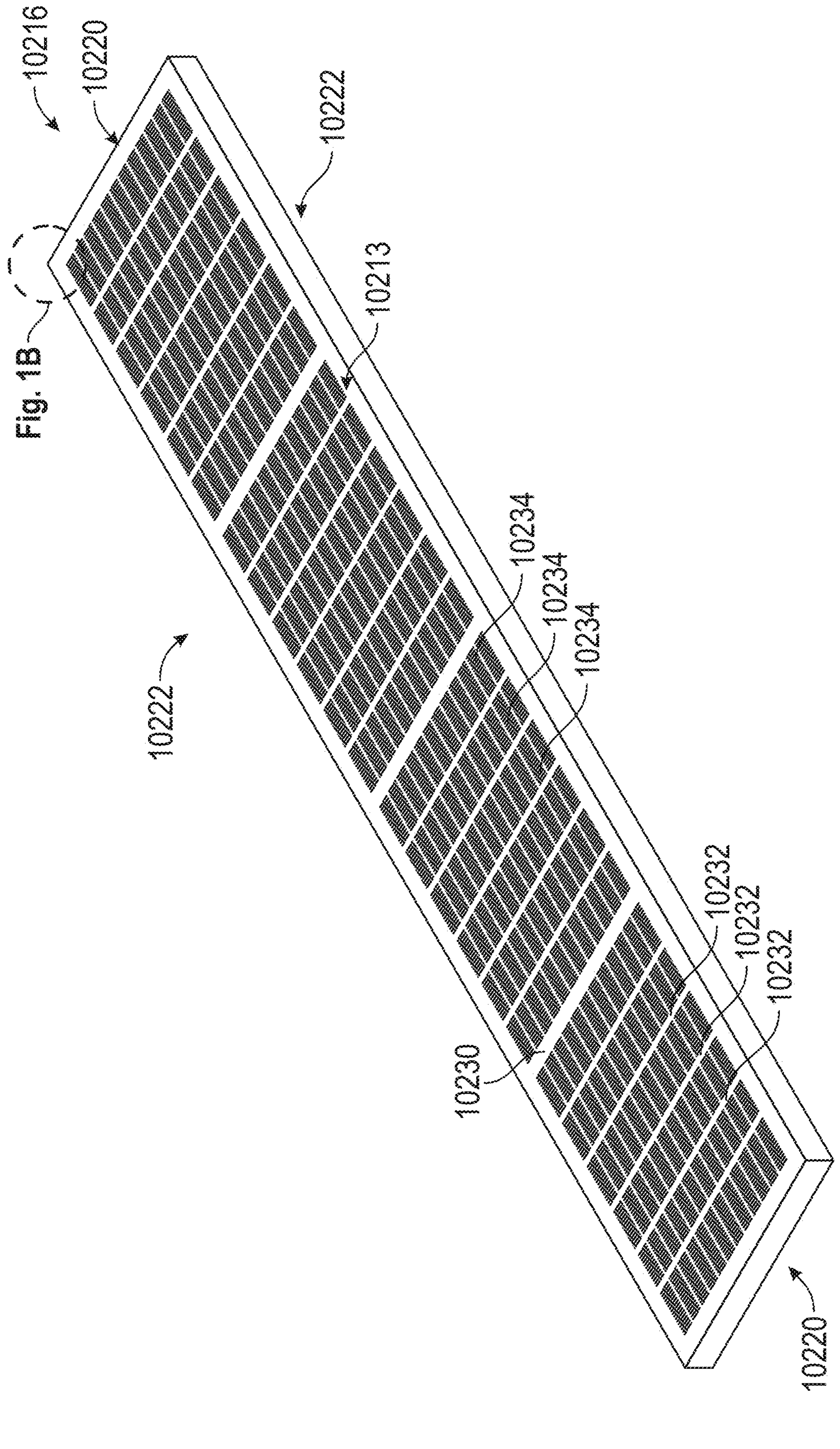
FIG. 1A illustrates an injection molded thermoplastic screen element, according to an embodiment.

Embodiments of the present invention provide a screen assembly that includes injection molded screen elements. Injection molded screen elements provide many advantages in screen assembly manufacturing and vibratory screening applications. In certain embodiments of the present invention, screen elements are injection molded using a thermoplastic material. Individual ones of the screen elements are attached together to form a larger screen assembly. This allows one to create a screen assembly of virtually any size or shape from a plurality of smaller screen elements.

In many of the examples which follow, the screen elements are square or rectangular in shape. However, the screen elements could be triangular, trapezoidal, circular or virtually any other shape. A screen assembly could be created by attaching a plurality of the same size and shaped screen elements together. Alternatively, one can create a screen assembly by attaching together a plurality of screen elements where the screen elements have different sizes and/or different shapes.

As a general rule, the larger the screen element the easier and faster it is to assemble a complete vibratory screen assembly. However, the larger the screen element, the more difficult it is to injection mold extremely small structures, i.e. the structures forming the screening surface elements between the screening openings. The screen elements are designed to be large enough for efficient assembly of a complete screen assembly structure, yet small enough that they can be rapidly injection molded.

The size of the individual screen elements may also be influenced by the desired characteristics of the screen element or the resulting screen assembly. For example, when one is attempting to form a screen assembly where the screen surface elements have very fine dimensions, such as 40-100 microns in width, the passages in the injection mold used to make the screen elements must have correspondingly narrow dimensions. Injecting plastic or synthetic material into such a mold so that the injected material completely fills the mold cavities before becoming solid can be difficult, particularly if the distance the material must travel through the mold is great. For this reason, in some instances it makes sense to keep the overall dimensions of the mold, and the corresponding screen element, fairly small so that the plastic injected into the mold need not travel very far through the mold during the molding process. This ensures that the plastic fully fills the cavities in the mold before solidifying.

One can balance the desire for a large screen element against the need to form very fine screen surface elements by using molds that are relatively small in a first dimension and relatively large in a second dimension, such as rectangular molds. One can then inject material into the mold so that the material travels through the passages in the mold in the small-dimension direction. This keeps the distance traveled by the material in the mold short, which helps to ensure the mold cavities are fully filled before the material solidifies.

So long as the overall dimensions of the screen elements are kept relatively small, it is possible to form screen elements via injection molding where the screen elements have very fine or narrow screen surface elements, resulting in screen elements with a high open screening area. For example, it is possible to form screen elements with screen surface elements having a width or thickness of 40-100 microns. Such screen elements can exhibit an open screening area of 15-40% of the overall screening area.

Open screening area is a critical feature of vibratory screen assemblies. The average usable open screening area (i.e., actual open area after taking into account the structural steel of support members and bonding materials) for traditional 100 mesh to 200 mesh wire screen assemblies may be relatively high before the screens are placed into use. Traditional mesh wire screens, however, blind fairly quickly in the field which results in the actual opening screening area being reduced fairly quickly. It is not uncommon for traditional metal screens to blind within the first 24 hours of use and to have the actual open screening area reduced by 50%. In contrast, plastic or synthetic screens elements formed by injection molding tend to not blind and can provide much higher open screening area values for extended periods of time.

Traditional wire assemblies also frequently fail as a result of wires being subjected to vibratory forces which place bending loads of the wires. Injection molded screen assemblies, according to embodiments of the present invention, in contrast, rarely fail because of a loss of structural stability. In fact, screen assemblies according to embodiments of the present invention have extremely long lives and may last for long periods of time under heavy loading. Screen assemblies according to the present invention have been tested for months under rigorous conditions without failure or blinding whereas traditional wire assemblies were tested under the same conditions and blinded and failed within days.

In embodiments of the present invention a thermoplastic is used to injection mold screen elements. As opposed to thermoset type polymers, which include liquid materials that chemically react and cure under temperature, use of thermoplastics is often simpler and may be provided, e.g., by melting a homogeneous material (often in the form of solid pellets) and then injection molding the melted material. Not only are the physical properties of thermoplastics optimal for vibratory screening applications but the use of thermoplastic liquids provides for easier manufacturing processes, especially when micro-molding parts as described herein.

The use of thermoplastic materials to form screen elements provides screen assemblies that exhibit excellent flexure and bending fatigue strength. Thermoplastics are ideal for parts subjected to intermittent heavy loading or constant heavy loading, as is encountered with vibratory screens used on vibratory screening machines. Because vibratory screening machines are subject to motion, the low coefficient of friction of the thermoplastic injection molded materials provides for optimal wear characteristics. Indeed, the wear resistance of certain thermoplastics is superior to many metals. Further, use of thermoplastics as described herein provides an optimal material when making "snap-fits" due to its toughness and elongation characteristics. The use of thermoplastics in embodiments of the present invention also provides for resistance to stress cracking, aging and extreme weathering.

The heat deflection temperature of thermoplastics can be in the range of 200° F. With the addition of glass fibers, this can increase to approximately 250° F. to 300° F. or greater. The introduction of glass or carbon fibers also can increase rigidity, as measured by Flexural Modulus, from approximately 400,000 PSI to over approximately 1,000,000 PSI. All of these properties are ideal for the environment encountered when using vibratory screens on vibratory screening machines under the demanding conditions encounter in the field.

Various materials may be incorporated into the screen elements depending on the desired properties of the embodiments. Thermoplastic polyurethane (TPU) may be incorporated into embodiments, providing elasticity, transparency, and resistance to oil, grease, and abrasion. TPU also has high shear strength. These properties of TPU are beneficial when applied to embodiments which will be subjected to high vibratory forces, abrasive materials and high load demands. Different types of TPU may be incorporated into embodiments depending on the material being screened. For example, polyester-based TPUs may be incorporated into screen assemblies used for oil and/or gas screening because the esters provide superior abrasion resistance, oil resistance, mechanical integrity, chemical resistance and adhesion strength. Poly-ether based TPUs may be incorporated into mining applications where hydrolysis resistance (a property of ether based TPUs) is important. Materials for embodiments may be selected or determined based upon a variety of factors, including performance properties of each material and costs associated with using the materials.

The materials used to form screen elements may be selected to have high temperature tolerance, chemical resistance, hydrolytic resistance, and/or abrasion resistance. Screen elements may incorporate materials, such as TPUs, providing the screen elements with a clear appearance. Clear screen elements may allow for efficient laser transmission through the screen elements for laser welding purposes.

Disclosed herein are embodiments of screen assemblies formed from many individually injection molded thermoplastic screen elements that are bonded together, such as by thermoplastic welding or other methods, to form a large screening surface In some embodiments, reinforcement fibers may be added to the structure to provide added strength, particularly in tension. The reinforcement fibers may be fibers or wire that is partially or completely embedded within the material of the screen elements. Such reinforcement fibers can help the screen assembly withstand tensioning loads imposed by the mounting elements used to secure a screen assembly to a vibratory screening machine.

As explained above, it would be possible to form multiple small screen elements by casting thermoset materials in a mold. Such thermoset screen elements could then be attached to one another via fasteners or adhesive to form a larger screen assembly. But that process has many drawbacks that making that approach unattractive, particularly when compared to screen elements made by injection molding a thermoplastic.

For example, the time required to cast a small screen element with thermoset materials is measured in hours. In contrast, one can form a small screen element by injection molding a thermoplastic in seconds.

Also, once a screen element has been cast with thermoset materials it is no longer possible to re-melt or re-form the screen element. As a result, the only way to attach together multiple thermoset screen elements is via the use of adhesives or mechanical fasteners.

In contrast, injection molded thermoplastics and injection molded thermoplastic screen elements may be re-melted and welded together at their edges. Welding and other heat and non-heat-based techniques may be used to form a strong bond between individual injection molded thermoplastic screen elements, all without the use or adhesives or mechanical fasteners. Heat welding, friction stir welding and ultrasonic welding techniques may be used to join together multiple individual injection molded thermoplastic screen elements to form a large screen assembly.

The re-melting qualities of injection molded thermoplastics also allows reinforcement fibers to be easily added to a thermoplastic screen assembly. This can be accomplished by remelting selected portions of a thermoplastic material of the screen assembly and inserting reinforcement fibers into the melted portions of the thermoplastic screen assembly. Also, as will be described below, two or more thermoplastic screen elements may be joined together by melting the side edges of the screen elements, bringing the side edges together, and then allowing the melted portions to cool and solidify. When this sort of a process is conducted to fasten together multiple thermoplastic screen elements to form a larger screen assembly, one or more reinforcing fibers can be positioned between the melted side edges of the thermoplastic screen elements as the screen elements are brought together. This results in the reinforcing fiber(s) being encapsulated into the larger structure at locations between the individual screen elements during the process of fastening the screen elements together.

It would be virtually impossible to incorporate reinforcement fibers into the material of thermoset screen elements after the thermoset screen elements have been formed. Thus, it is impossible to add reinforcement fibers to a screen assembly formed of thermoset screen elements. The only way to get reinforcement fibers into thermoset screen elements is to insert them into the mold before the thermoset material is introduced. While this might work to get reinforcement fibers into individual thermoset screen elements, if multiple thermoset screen elements are to be attached together to form a larger screen assembly, once cannot get individual reinforcement fibers to run throughout the structure across multiple ones of the thermoset screen elements. For all these reasons, it is impossible to effectively add reinforcement fibers to a screen assembly formed of a plurality of thermoset screen elements in the same way that it is possible with thermoplastic screen elements.

Systems and methods for taking advantage of injection molded thermoplastic melting qualities to form large thermoplastic screening assemblies are described below. These systems and methods can include incorporating reinforcement fibers into the material of the screen elements that make up a screen assembly.

Figure 1B:
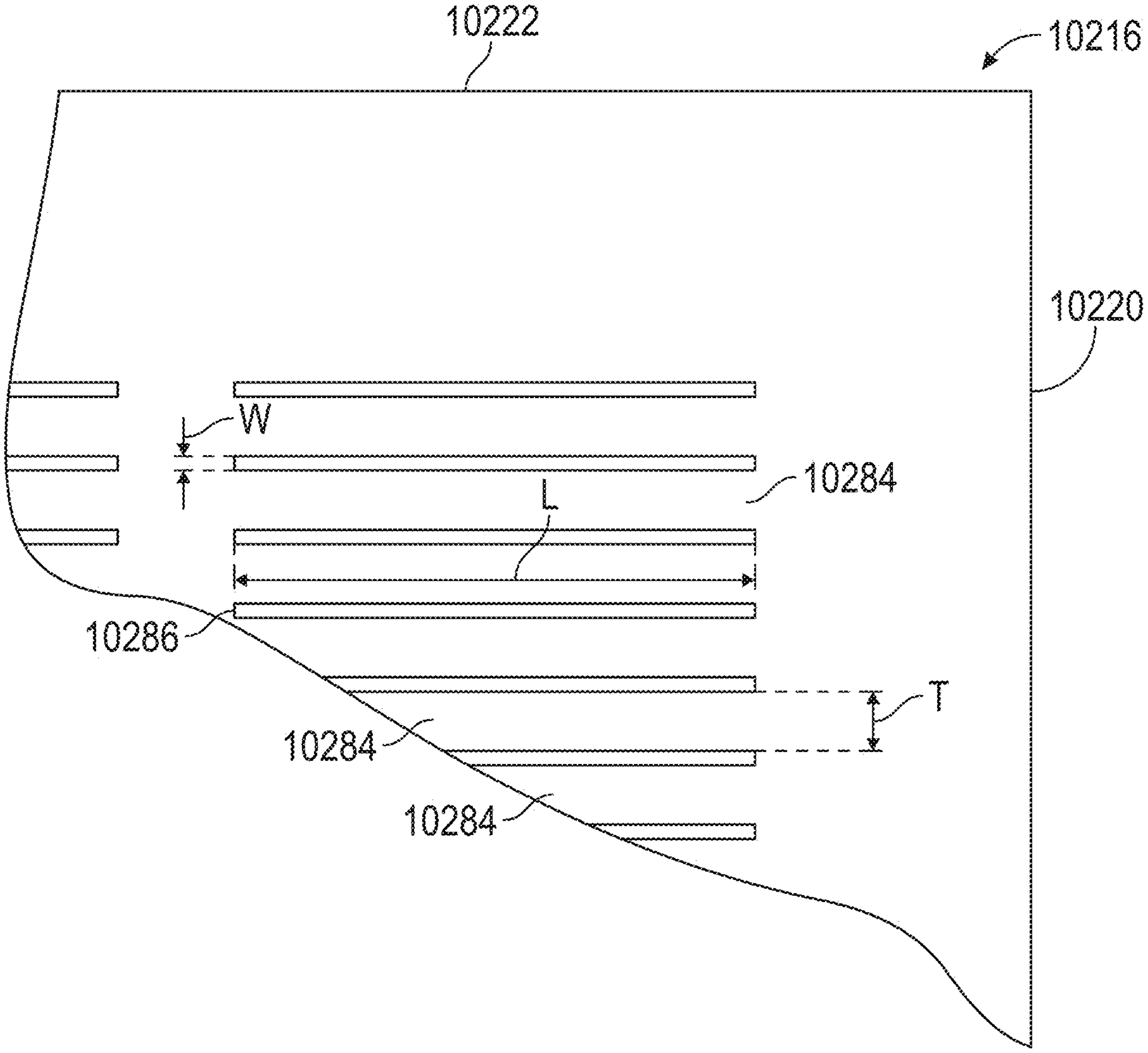
FIG. 1B illustrates a detailed view of the injection molded thermoplastic screen element for FIG. 1A, according to an embodiment.

FIGS. 1A and 1B illustrate an injection molded thermoplastic screen element 10216 having substantially parallel end portions 10220 and substantially parallel side portions 10222 that are substantially perpendicular to the end portions 10220. As depicted in FIG. 1B, the screening surface 10213 includes surface elements 10284 running parallel to the side portions 10222 and forming screening openings 10286. Each screen element 10216 is a single thermoplastic injection molded piece.

As illustrated in FIG. 1B, the surface elements 10284 have a thickness T that extends between adjacent screening openings 10286 and which may vary depending on the screening application and configuration of the screening openings 10286. T may be, for example, approximately 10 microns to approximately 4000 microns, depending on the embodiment. Forming the screen surface elements 10284 to have a thickness T of between 50-150 microns can provide a screening surface with desirably high open screening area values, depending on the width W of the screening openings 10286. The screening openings 10286 are elongated slots having a length L and a width W, which may be varied for a chosen configuration. The width W may be a distance of approximately 10 microns to approximately 6000 microns between inner surfaces of adjacent screen surface elements 10284. In some embodiments, the width W may be a distance of approximately 25 microns to approximately 2000 microns between inner surfaces of adjacent screen surface elements 10284. The screening openings 10286 are not required to be rectangular but may be thermoplastic injection molded to any shape suitable to a particular screening application, including approximately square, circular and/or oval, as discussed herein.

Screen elements may be made from various materials depending on the desired properties of the resulting screen assembly. Thermoplastic polyurethane (TPU) may be incorporated into embodiments of the screen elements and screen assemblies, providing elasticity, transparency (where helpful or necessary), and resistance to water, chemicals having varying pH, oil, grease, and abrasion. TPU also has high shear strength. These properties of TPU are beneficial when applied to embodiments of the screen elements and screen assemblies, which are subjected to high vibratory forces, abrasive materials and high load demands.

The material used to form the screen elements of a screen assembly may be selected to have high temperature tolerance, chemical resistance, hydrolytic resistance, and/or abrasion resistance. Screen elements may incorporate materials, such as TPUs, providing the screen elements with a clear appearance. Clear screen elements may allow for efficient laser transmission through the screen elements for laser welding purposes. However, where laser welding will not be used, the screen elements could be opaque and/or colored. Various different colorants could added to the TPU material to produce screen elements in different colors, where the color may be indicative of various properties of the screen elements. For example, a first color could be used for screen elements having screening openings of a first size, and a second color could be for screen elements having screening openings of a second different size.

Figure 2:
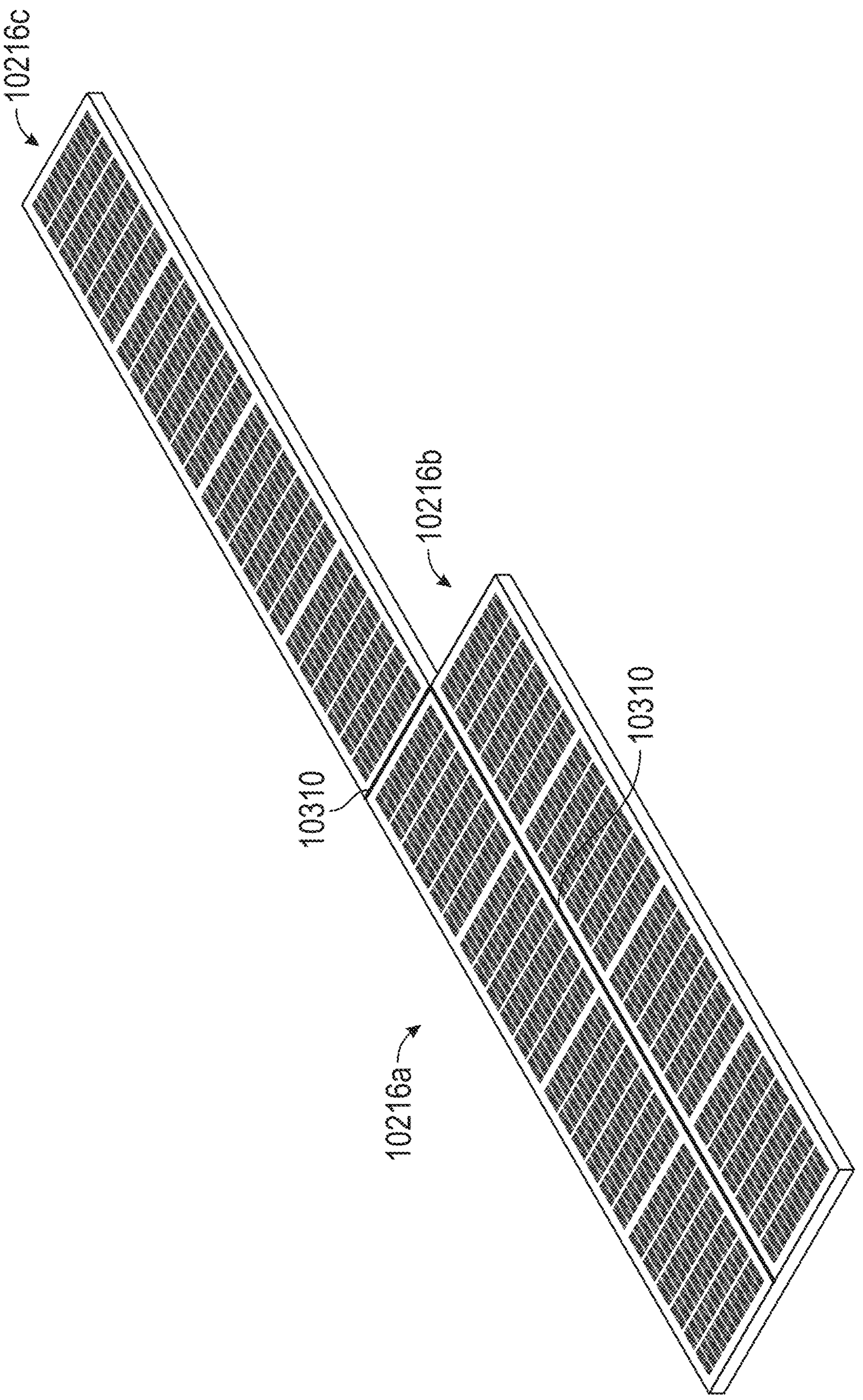
FIG. 2 illustrates a coupling of multiple injection molded thermoplastic screen elements to each other to form a screen assembly, according to an embodiment.

FIG. 2 illustrates how multiple injection molded thermoplastic screen elements **10216*a*, 10216*b*, 10216*c* are coupled to each other along seams 10310 to form a portion of a screen assembly. Multiple injection molded thermoplastic screen elements 10216** may be bonded, joined, or otherwise coupled together in many ways.

In some embodiments, the thermoplastic screen elements may be joined together through welding, wherein two or more thermoplastic screen elements are joined together using heating, pressure, and cooling. "Welding" in this context means causing the material of portions of two screen elements to at least partially melt, bringing the melted portions of the two screen elements together and then allowing the material to cool so that the material of the two screen elements is fused or joined together.

To begin the welding process, the surfaces of the thermoplastic screen elements that are to be joined together, such as adjacent side surfaces 10222 or adjacent end surfaces 10220, are heated to their melting point, or thermoplastic state. This could be a temperature at or above about 380° F. Each thermoplastic material has its own melting point, which may range between for example, 300° F. and 1050° F. The adjacent side surfaces, such as side surface of screen element **10216*a* and screen element 10216*b* are then pressed or otherwise held together until the material cools. Pressure applied to the screen elements 10216*a*, 10216*b* to push the side surfaces together allows the material along the seam 10310** to bond.

In some embodiments, the welding process may employ hot air plastic welding, where hot air is used to heat the thermoplastic. In some embodiments, a hot iron welding process may be used to cause the thermoplastic material along the edges of a screen element to melt. In this type of a process, a heated element such as a heated blade, iron or some other type of heated device is brought adjacent to or in contact with edges of the thermoplastic screen elements to melt the thermoplastic material at the edges.

In some embodiments, a laser or light welding process may employ electromagnetic radiation such as laser light to melt the thermoplastic material at the edges. In yet other embodiments, friction stir welding may be used to join the thermoplastic screen elements together. In friction stir welding, heat is generated by friction between a rotating tool and the adjacent surfaces of the thermoplastic screen elements.

In some embodiments, the weld extends from a top surface of the screen element to the bottom surface of the screen element. In some embodiments, the weld depth extends only partway between the top surface and the bottom surface. In some embodiments the weld depth extends from the top surface or the bottom surface part of the way towards the opposite surface of the screen elements.

In some embodiments, computer numerical control (CNC) machines may automate the welding of the screen elements. Multiple screen elements may be placed into a jig or other form and a CNC machine may control a heating tool such as a laser or other light radiation tool, a heating element, friction stir welding tool, or other some other type of welding tool to melt edges of adjacent screen elements along the seams.

In one exemplary process a heating element in the form of a soldering iron is heated to between 40° and 1000° F. Adjacent edges of two screen elements are pressed together and the heating element is moved along the joint or seam 10310, melting the thermoplastic material on the adjacent edges of the screen elements. In some instances, the heating element is brought adjacent to but not touching the seam, and the heating tool is then moved along the seam to cause the material of the two screen elements to melt and fuse together. In other instances the heating element could be brought into contact with material of the two screen elements at the seam, and the heating element would then be dragged along the seam to cause the material of the two screen elements at the seam to melt and fuse together. Regardless, the screen elements are held together while the material cools. Once cool, the two screen elements are joined together. For example, as shown in FIG. 2, the heating element could be moved or dragged along the two seams 10310 while the three screen elements **10216*a*, 10216*b*, 10216*b* are held together to cause the material of the three screen elements to be joined along the seams 10310**.

Figure 3:
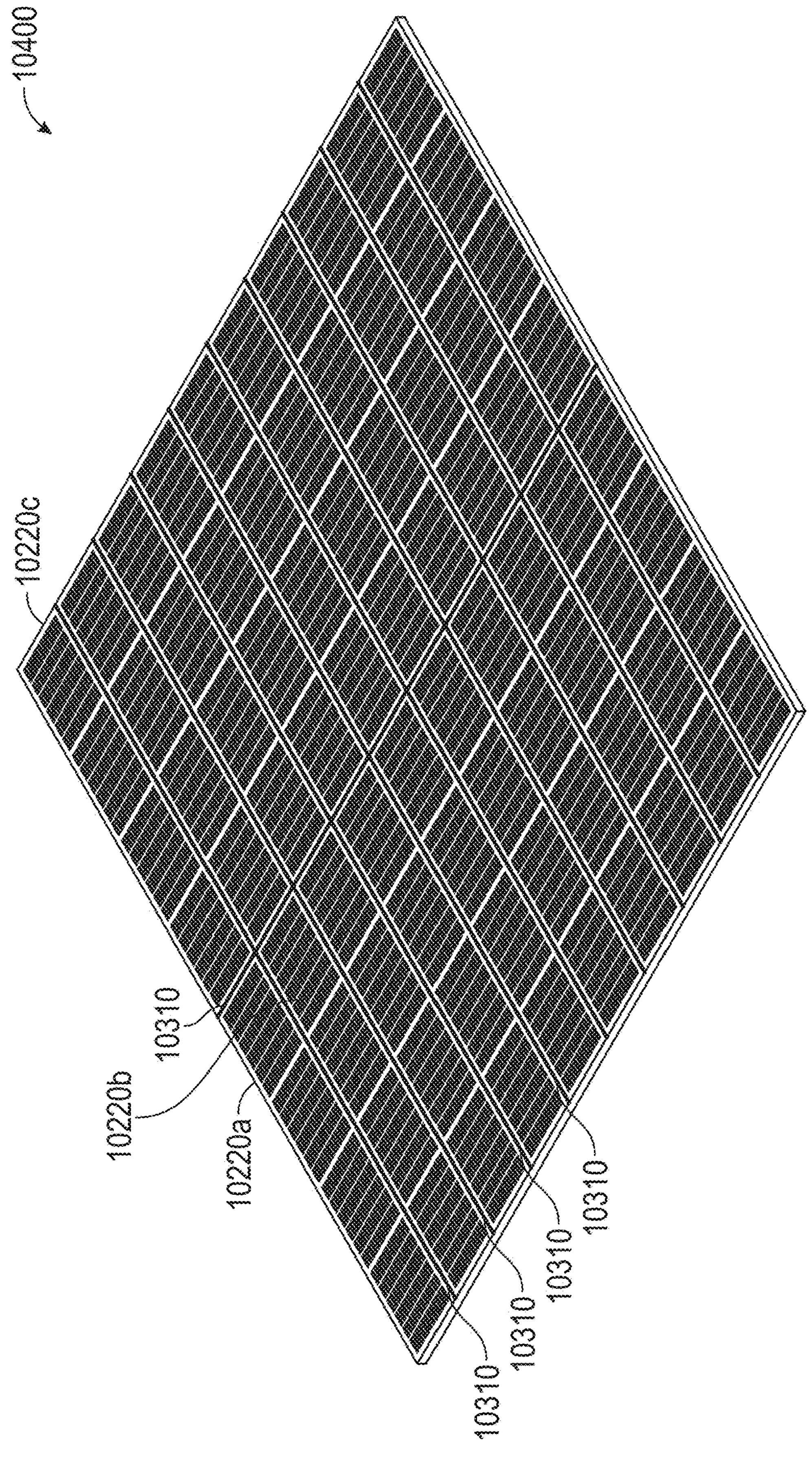
FIG. 3 illustrates a coupling of multiple injection molded thermoplastic screen elements together to each other to form a screen assembly, according to an embodiment.

The process of forming a screen assembly may continue by welding additional screen elements onto the first three screen elements shown in FIG. 2 to fabricate a larger screen assembly, like the screen assembly 10400 depicted in FIG. 3. In the embodiments depicted in FIGS. 2 and 3 each screen element includes four distinct screening "areas" separated by reinforcement regions. Thus, the screen assembly 10400 depicted in FIG. 3 is formed from 20 screen elements 10216 arranged in a 2 by 10 array. In alternate embodiments, the individual screen elements could have different dimensions and different configurations. Also, in alternate embodiments the number of screen elements that are joined together to form a screen assembly could vary depending on the desired overall dimensions of the screen assembly.

In the embodiments depicted in FIGS. 2 and 3, a plurality of screen elements 10216 that are the same size are joined together by welding or some other process to make a screen assembly. In alternate embodiments, the individual screen elements may have different sizes or shapes.

As discussed herein, individual screen elements may be of many different sizes, for example, 1"×1", 1"×6", 1"×5", 2"×5", 4"×5", etc. Regardless, a plurality of screen elements can be welded or joined together to make sub-assemblies, and multiple sub-assemblies can be joined together to make a larger screen assembly.

For example, FIG. 3 depicts a sub-assembly 10400 comprising twenty screen elements 10216. Multiple sub-assemblies 10400 can then be joined together using the same welding or joining techniques to make a screen assembly 10500 like the one depicted in FIG. 4. An advantage of fabricating sub-assemblies 10400 before fabricating a larger screen assembly is that many sub-assemblies 10400 can be fabricated in a variety of different sizes and shapes. Those different sized/shaped sub-assemblies may be stored in an easy to handle and store form factor. The sub-assemblies can then be quickly assembled into larger screen assemblies based on demand or other factors. Also, a variety of sized sub-assemblies make it possible to form larger screen assemblies in a variety of different sizes and shapes to satisfy custom requirements.

Figure 4:
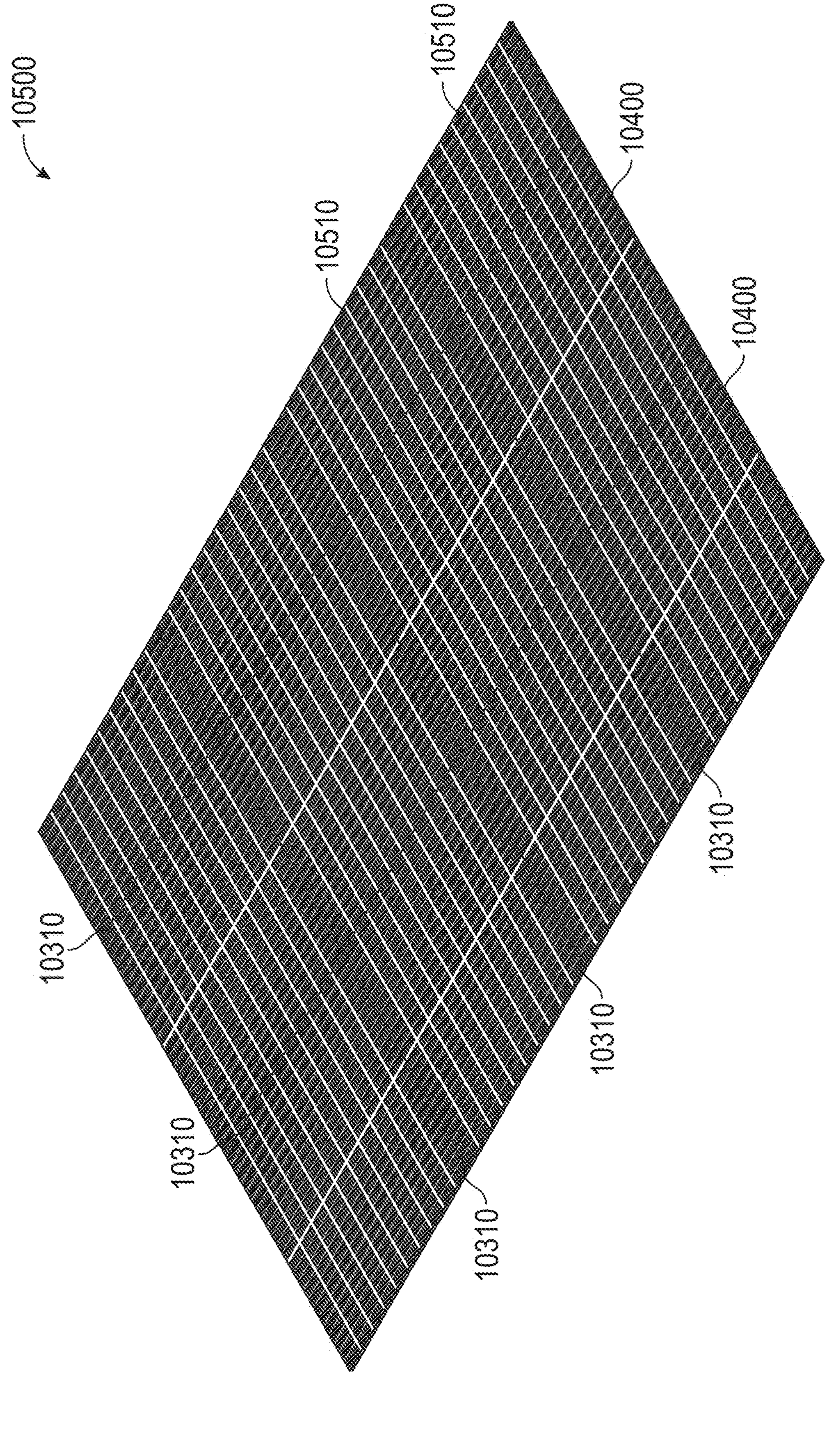
FIG. 4 illustrates a thermoplastic screen assembly formed by coupling multiple injection molded thermoplastic screen elements to each other, according to an embodiment.

FIG. 4 illustrates a thermoplastic screen assembly 10500 formed by joining together multiple sub-assemblies 10400. The thermoplastic screen assembly 10500 depicted in FIG. 4 is a 40"×30" thermoplastic screen assembly fabricated by joining eight 10"×10" thermoplastic sub-assemblies 10400 and four 10"×5" thermoplastic sub-assemblies 10510. The thermoplastic sub-assemblies 10400, 10510 may be joined together through any of the processes discussed herein with respect to FIGS. 2 and 4 along seams 10310.

Figure 5A:
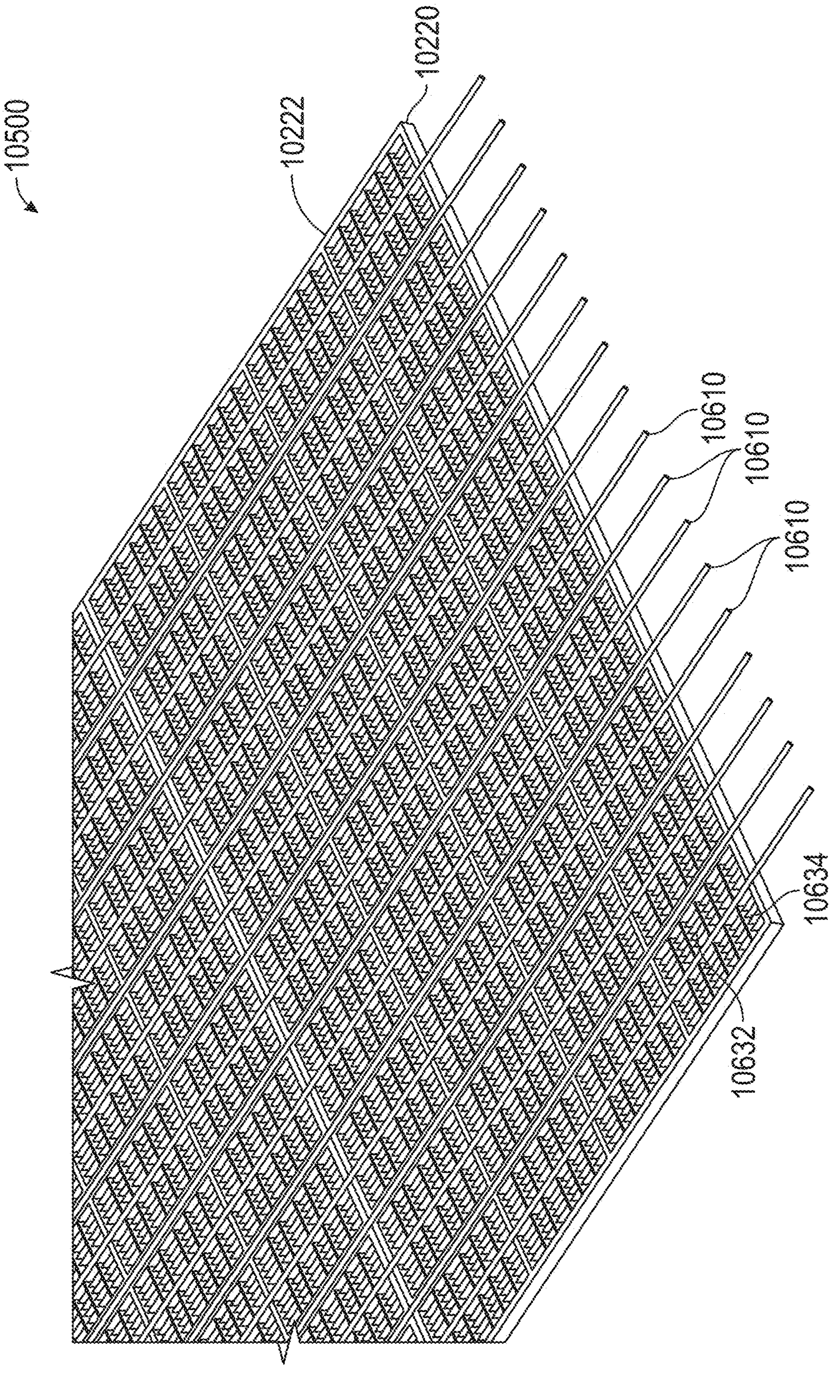
FIG. 5A illustrates a bottom isometric view of a screen assembly with reinforcement fibers embedded therein for front-to-back tension applications, according to an embodiment.
Figure 5B:
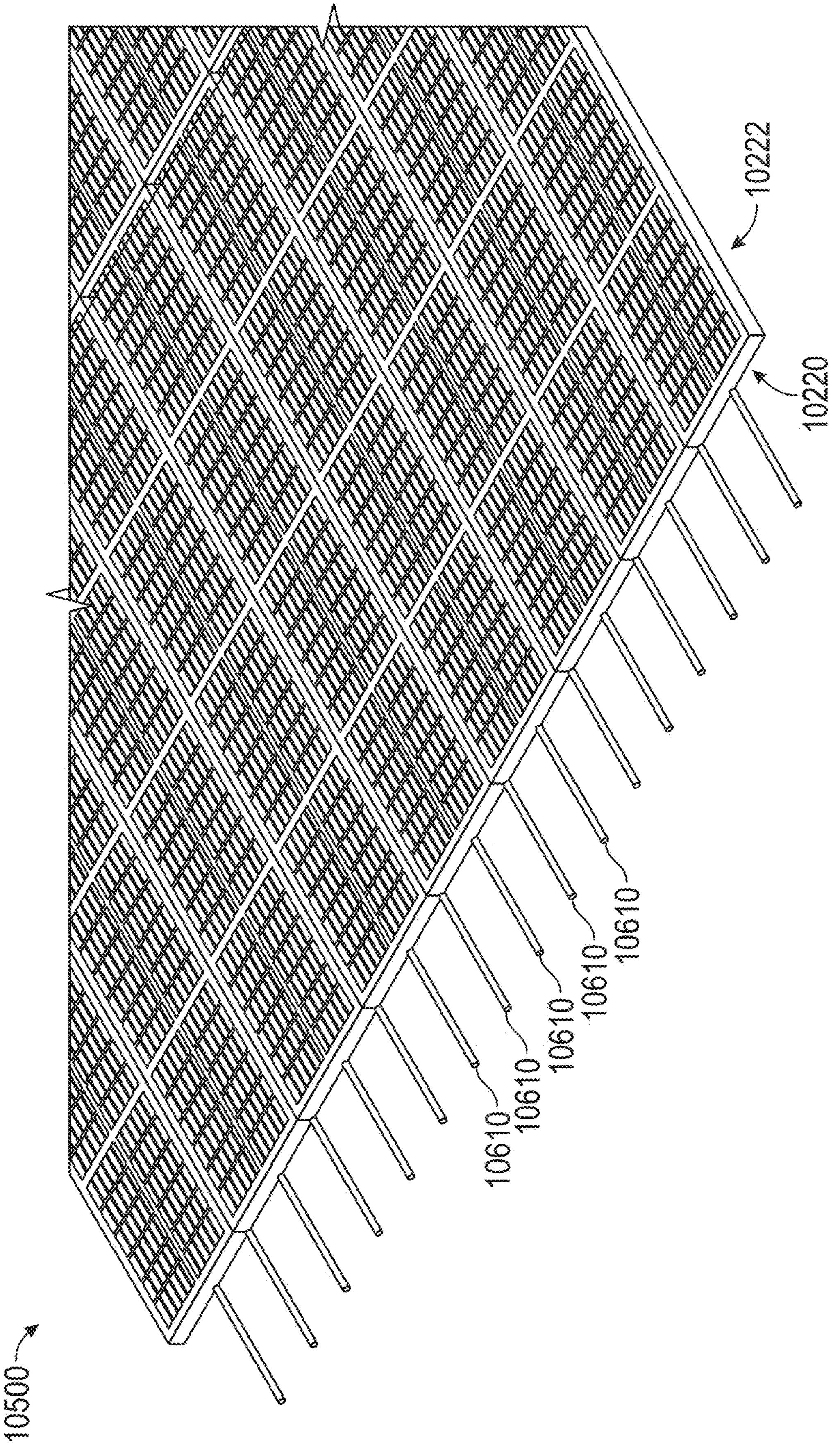
FIG. 5B illustrates a top isometric view of the screen assembly of FIG. 5A

After or while forming a thermoplastic screen assembly from a plurality of screen elements, one or more reinforcement fibers may be embedded into the screen assembly. FIGS. 5A and 5B illustrate bottom and top isometric views of a screen assembly 10500 with reinforcement fibers 10610 embedded therein. Reinforcement fibers 10610 are oriented within the screen assembly 10500 so that they extend in the direction in which the screen assembly will be tensioned. In the embodiment shown in FIGS. 5A and 5B, the screen assembly 10500 will be tensioned from the ends 10220.

The reinforcement fibers 10610 may be sandwiched between two adjacent screen elements when the screen elements are joined together. Alternatively, or in addition, reinforcement fibers 10610 may be embedded into reinforcement members of the screen elements.

In the embodiment illustrated in FIG. 1A, the screen element 10216 includes three first reinforcement members 10230 that extend parallel to the end portions 10220 and between the side portions 10222. These first reinforcement members 10230 separate the four main screening sections of the screen element 10216. Smaller width second reinforcement members 10232 also extend parallel to the end portions 10220 and between the side portions 10222. These second reinforcement members 10232 extend between each row of screening openings. The screen element 10216 also includes third reinforcement members 10234 that extend parallel to the side portions 10222. Each of these third reinforcement members 10234 separate individual groups of the screening openings.

Figure 6:
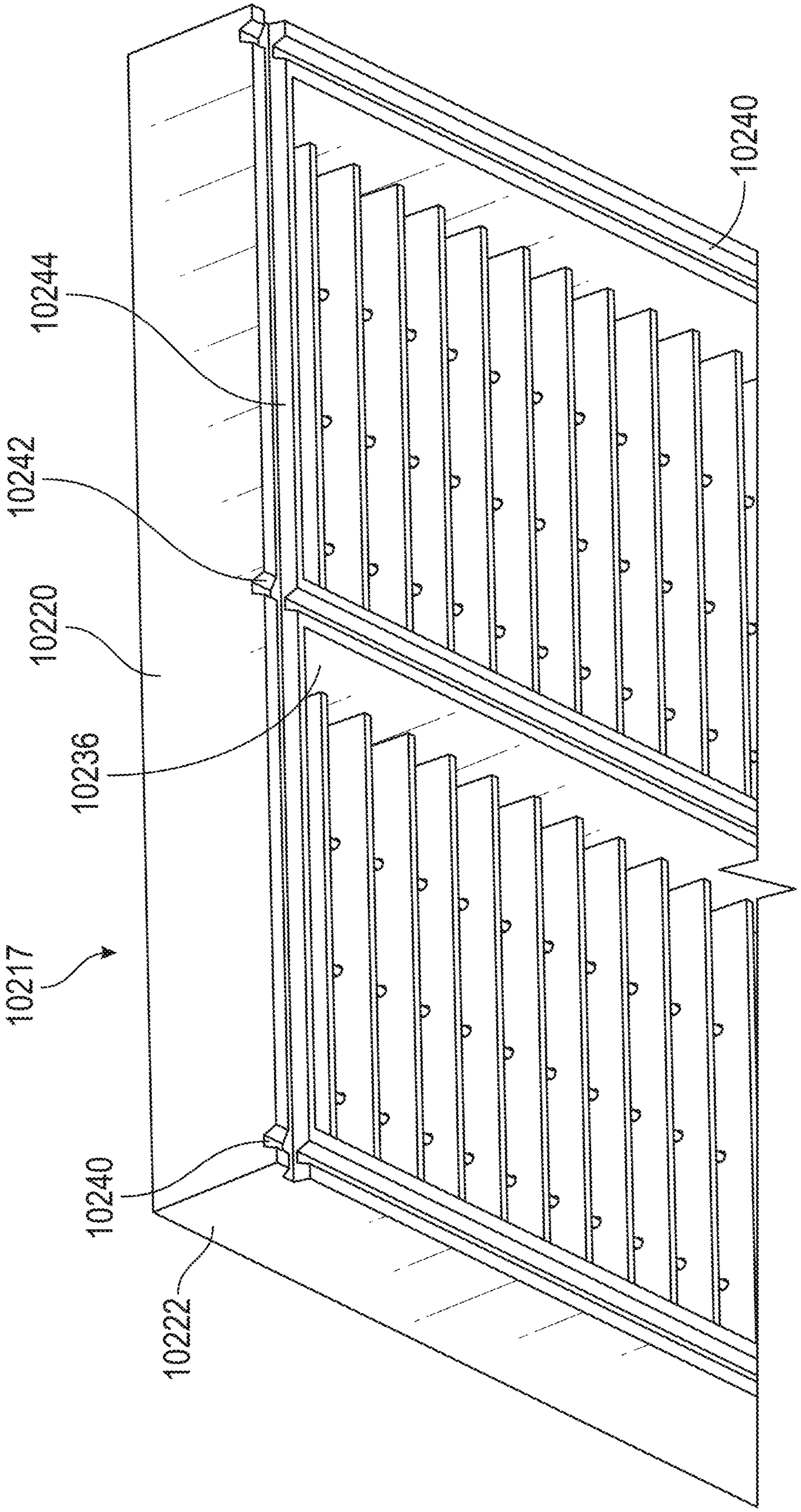
FIG. 6 is a bottom isometric view of a screen element with molded grooves for receiving a reinforcement fiber.

Reinforcement fibers 10610 can be embedded in the reinforcement members 10230, 10232, 10234 of the individual screen elements 10216 after multiple screen elements 10216 have been joined together to form a screen assembly 10500 like the one shown in FIGS. 5 and 6. The reinforcement fibers 10610 may be embedded into the respective reinforcement members in many ways.

In some embodiments, a reinforcement fiber 10610 may be embedded into the reinforcement members of the screen elements 10216 by localized heating of the reinforcement members to cause a portion of the reinforcement members to melt. The reinforcement fiber 10610 is then pressed into the melted portion of the reinforcement members. In some embodiments, a heating element such as a soldering iron may be used to press the reinforcement fiber 10610 into the reinforcement members as the soldering iron melts the material of the reinforcement members. In some embodiments, an elongated heating element that extends all or a portion of the length of the screen assembly 10500 may be brought adjacent to or in contact with a set of adjoining reinforcement members of multiple screen elements. The heating element then simultaneously melts the material of multiple ones of the reinforcement members. After the reinforcement members are melted, a reinforcement fiber is pressed into the melted material to embed the reinforcement fiber into the material of the reinforcement members. In some embodiments, the reinforcement fiber 10610 may be placed along an edge of such an elongated heating element. Then, the elongated heating element may press a length of reinforcement fiber 10610 into the reinforcement members as the heating element melts the reinforcement members.

Other methods may be used to melt the thermoplastic of the screen elements in order to embed a reinforcement fiber 10610 in the material of the screen elements. For example, laser or light radiation may be used to cause localized melting of the material of the screen elements so that a reinforcement fiber 10610 can be embedded therein. In some embodiments, hot air also may be used to melt the material of the screen elements.

In some embodiments, such as when the melting point of the reinforcement fiber is greater than the melting point of the thermoplastic material in which it is embedded, the reinforcement fibers themselves may be heated above the melting point of the thermoplastic material of the reinforcement members. The heat of the fiber can then be used to melt the thermoplastic material as the heated fiber is pressed into the reinforcement members of the screen elements, or perhaps into a seam joining two or more screen elements.

In some embodiments, the reinforcement fiber is an aramid fiber, such as Kevlar. In some embodiments, metal strands are intertwined with the aramid fiber to form the reinforcement fiber. In some embodiments, the reinforcement fiber is stainless steel or other metal in either a solid core or stranded form. In some embodiments, the reinforcement fiber is a metal rod. In some embodiments, the reinforcement fiber is a yarn.

In some embodiments, embedding the reinforcement fibers into the thermoplastic material of the screen elements may involve only pressing the reinforcement fiber into a top or bottom surface of the screen elements, such as along a reinforcement member, so that the reinforcement fiber is only partially encapsulated in the thermoplastic material of the screen elements. In other embodiments, the reinforcement fibers are fully encapsulated in the thermoplastic material of the screen elements.

Embedding the reinforcement fibers 10610 into the material of the reinforcement members of the screen elements can prevent the reinforcement fibers 10610 from blocking any of the screening openings of the screen elements. Also, fully embedding the reinforcement fibers 10610 into the material of the screen elements or the screening assembly prevents the reinforcement fibers from being brought into contact with the material being screened by the screen assembly or the portions of the screening machine upon which the screen is mounted. Contact between the material to be screened or the screening machine and the reinforcement fibers 10610 tends to wear away and damage the reinforcement fibers 10610, particularly because the screen assemblies are being vibrated with respect to the material to be screened. Thus, it is desirable to fully embed the reinforcement fibers in the material of the screening assembly, where possible.

If it is not possible to fully embed the reinforcement fibers into the material of the screen elements, then it is preferable to partially embed the reinforcement fibers into the bottom surface of the screen assembly. If portions of the reinforcement fibers are exposed on the top surface of the screen assembly, the reinforcement fibers will be exposed to the material being screened while the screens are being vibrated. The relative motion between the screen assembly and the exposed portions of the reinforcement fibers and the material being screened will tend to wear away and/or damage the reinforcement fibers. On the other hand, if the exposed portions of the reinforcement fibers are located on the bottom surface of the screen assembly, far less damage occurs to the reinforcement fibers during use.

In some embodiments, the screen elements may be molded to include one or more grooves that are configured to receive one or more reinforcement fibers. FIG. 6 illustrates one such screen element 10217. In this embodiment, side grooves 10240 are molded into the bottom surfaces of the side edges 10222. In some embodiments, a central groove 10242 is molded into the bottom surface of a central reinforcement member 10236 that runs up the center of the length of the screen element 10217. In some embodiments, end grooves 10244 may be molded into the bottom surfaces of the ends 10220 of the screen element 10217. Of course, in any particular embodiment, only one of these types of grooves 10240/10242/10244 may be provided in the screen element.

When grooves 10240/10242/10244 are molded into a bottom surface of the screen elements, they facilitate embedding reinforcement fibers into the material of a screen assembly. Once the screen assembly has been formed by attaching multiple screen elements together, the grooves of the screen elements will align across the length and/or width of the screen assembly. Reinforcement fibers can then be laid into the aligned grooves and heat can be selectively applied to partially melt the material of the screen elements in and around the grooves to cause the reinforcement fibers to become embedded into the material.

In some instances, the reinforcement fibers will become fully embedded in the material of the screen elements. In other instances, the fibers will be partially embedded into the material of the screen elements, but the exposed portions of the reinforcement fibers will be located on the bottom surface of the screen assembly where damage is less likely to occur. The material being screened will fall down through the screening openings of the screen elements. Because any exposed portions of the reinforcement fibers will be located on the bottom surfaces of the sides or ends of the screen elements, or on the bottom surface of a reinforcement member, the exposed portions of the reinforcement fibers will be effectively shielded from the material being screened. Thus, any wear of damage to the exposed portions of the reinforcement fibers is minimized.

Figure 7A:
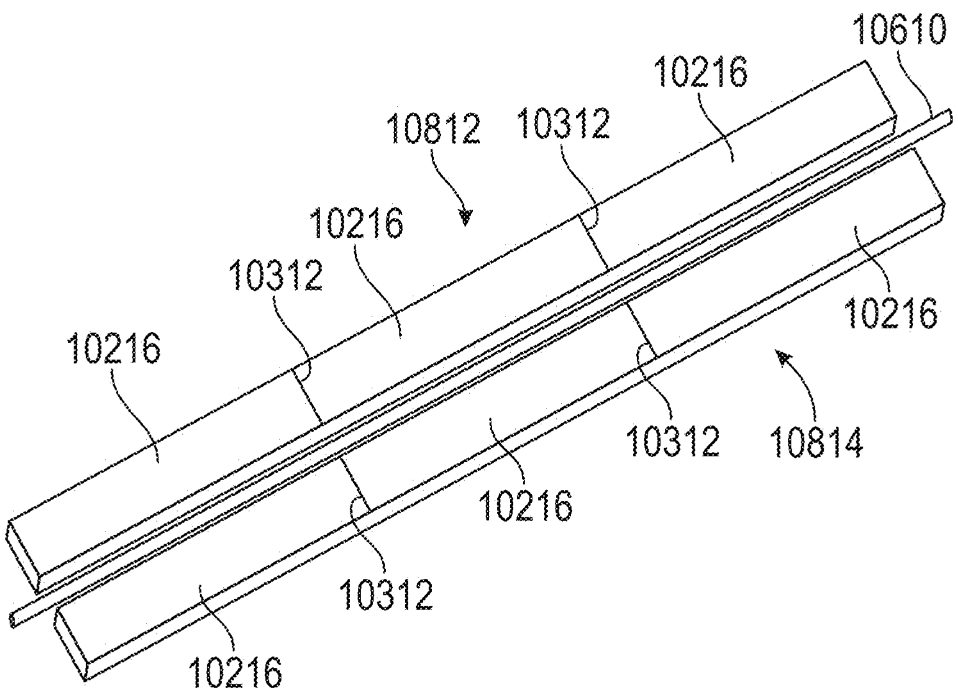
FIG. 7A is a perspective view showing how two strips of joined screen elements can be joined together with a reinforcement fiber sandwiched between the strips of screen elements.
Figure 7B:
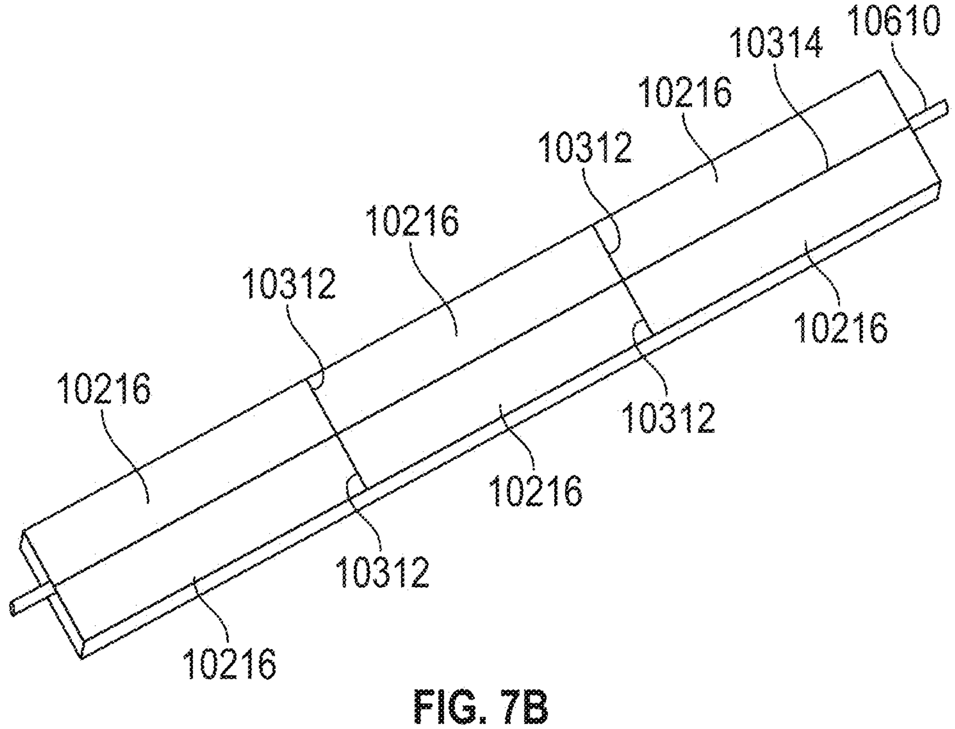
FIG. 7B illustrates the two strips of screen elements of FIG. 7A after the strips of screen elements have been joined together.

As mentioned above, reinforcement fibers 10610 could also be located between adjacent edges of the screen elements as the screen elements are joined together to form a screen assembly or sub-assembly. FIG. 7A illustrates two strips 10812, 10814 of screen elements 10216 that have been joined together, end-to-end along first seams 10312. One can join the two strips 10812, 10814 of screen elements together by melting the adjacent side edges, bringing the two strips 10812, 10814 of screen element together and allowing the material of the screen elements to cool to form a structure as illustrated in FIG. 7B. The side edges of the strips 10812, 10814 of screen elements are joined along a second seam 10314 that extends the length of the structure.

As illustrated in FIG. 7A, just before the two strips 10812, 10814 of screen element are joined together, a reinforcement fiber 10610 can be positioned between the side edges of the screen elements 10216 of each strip 10812, 10814 of screen elements. Once the two strips 10812, 10814 of screen elements are brought together and the material is allowed to cool, the reinforcement fiber 10610 will be embedded in the structure along the lengthwise scam 10314. Ideally, the reinforcement fiber 10610 is positioned between the top and bottom surfaces of the screen elements 10216 so that no portion of the reinforcement fiber is exposed.

Figure 8:
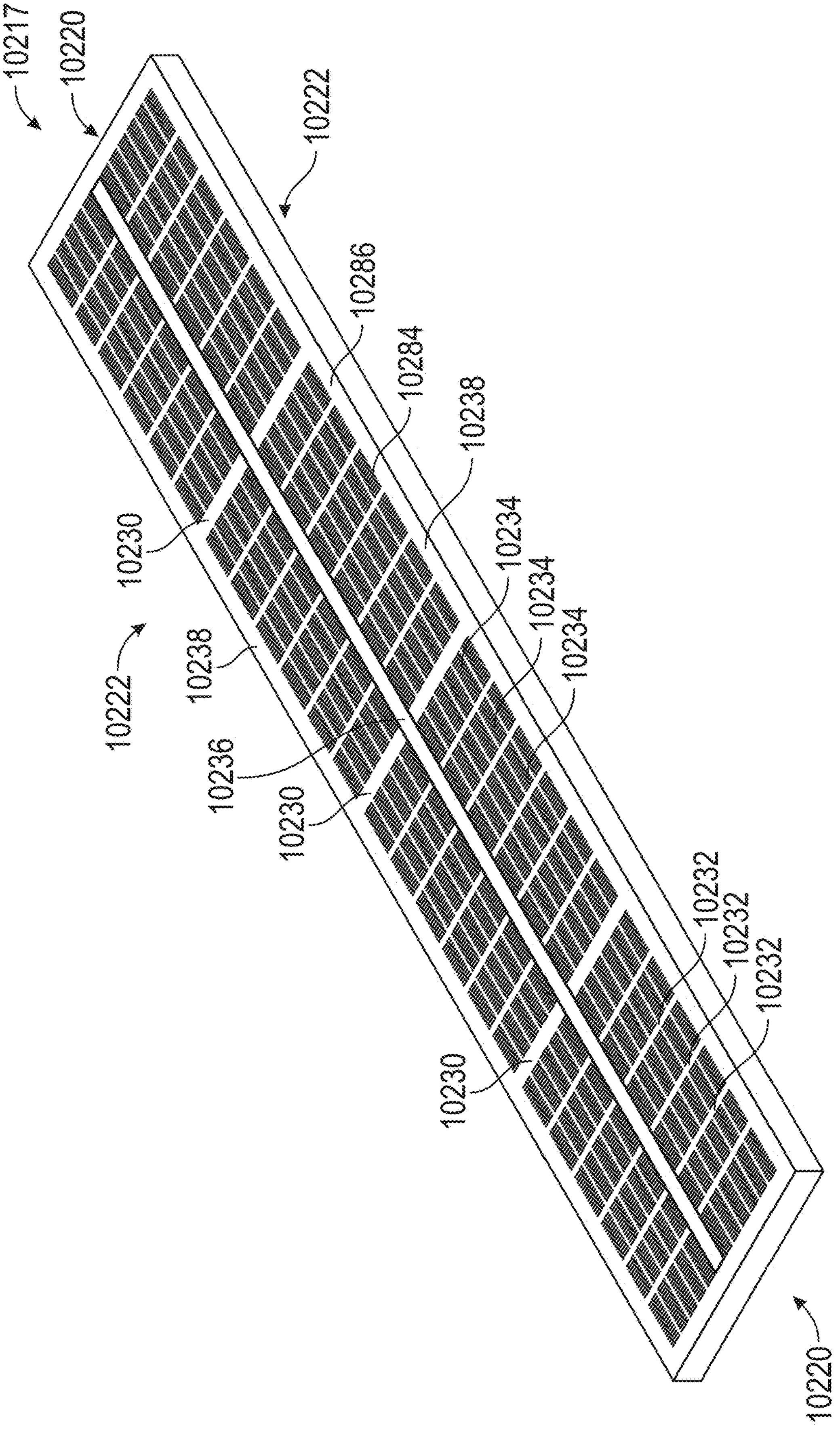
FIG. 8 illustrates a top isometric view of a screen element with a reinforcement member that extends down the middle of the length of the screen element.

The number of reinforcement members that are embedded in a screen assembly is selected to provide the screen assembly with sufficient tensile strength to withstand the tensioning forces that are applied to the screen assembly to mount and hold the screen assembly on the screening machine during screening operations. Because the screen assembly can be subjected to significant acceleration and vibratory forces, the tension used to hold the screen assembly on the screening machine can be significant. If a screen assembly is constructed as described above in connection with FIGS. 7A and 7B, where a reinforcement fiber 10610 is sandwiched between the side edges of long strips of screen elements, the number of reinforcement fibers that can be embedded in the screen assembly is limited by the number of seams 10314 between adjacent strips of screen elements. In some instances, that may result in the screen assembly not having a sufficient number of reinforcement fibers to comfortably withstand the tensioning forces that are applied to hold the screen assembly on the screening machine. If that is the case, it would be desirable to also embed additional reinforcement fibers into portions of the screening assembly located between the lengthwise seams 10314 that exist where side edges of the strips of screen elements are joined together. FIG. 8 illustrates an embodiment of a screen element 10217 that could be used for this purpose.

As illustrated in FIG. 8, the screen element 10217 includes end portions 10220 and side portions 10222. As in the embodiment illustrated in FIG. 1A, the screen element 10217 includes first reinforcement members 10230 that extend parallel to the end portions 10220 and between the side portions 10222, second reinforcement members 10232 that also extend parallel to the end portions 10220 and between the side portions 10222, and third reinforcement members that 10234 extend parallel to the side portions 10222 and between groups of the screening openings. The embodiment illustrated in FIG. 8 also includes a fourth reinforcement member 10236 that extends parallel to the side portions 10222 and between the end portions 10220. The fourth reinforcement member 10236 runs down the middle of the screen element 10217 in the lengthwise direction. The fourth reinforcement member 10236 provides a location between the side edges of the screen element 10217 in which a reinforcement fiber 10610 can be embedded. Also, as mentioned above, grooves can be molded into the bottom surfaces of the side portions 10222, end portions 10220 and the fourth reinforcement member 10236 to facilitate embedding reinforcement fibers.

Multiple screen elements 10217 like the one depicted in FIG. 8 can be joined end-to-end to form long strips of screen elements 10217. The side edges of the long strips are joined together as described above, and reinforcement fibers 10610 are embedded between the side edges of the long strips of screen elements, as also described above. Once a screen assembly has been formed in this way, additional reinforcement fibers 10610 can then be embedded in the fourth reinforcement members 10236 of the screen elements 10217 of each long strip of screen elements. Grooves molded into the bottom surfaces of the fourth reinforcement members 10236 of the screen elements can facilitate embedding additional reinforcement fibers into the screen assembly. This locates a reinforcement fiber 10610 between each lengthwise seam 10314 of side edges of adjacent strips of screen elements, essentially doubling the number of reinforcement fibers per unit of width of the screen assembly.

In some embodiments, the reinforcement fibers 10610 are embedded into the reinforcement members of the screen elements. However, in some applications it may not be possible to encapsulate the entire length of a reinforcement fiber 10610 in the thermoplastic material of the screen elements. Thus, some interim portions of a reinforcement fiber 10610 may not be encapsulated by the thermoplastic material. This can happen, for example, when the reinforcement members of the screen elements do not fully align along the entire length of a reinforcement fiber 10610.

Figure 9:
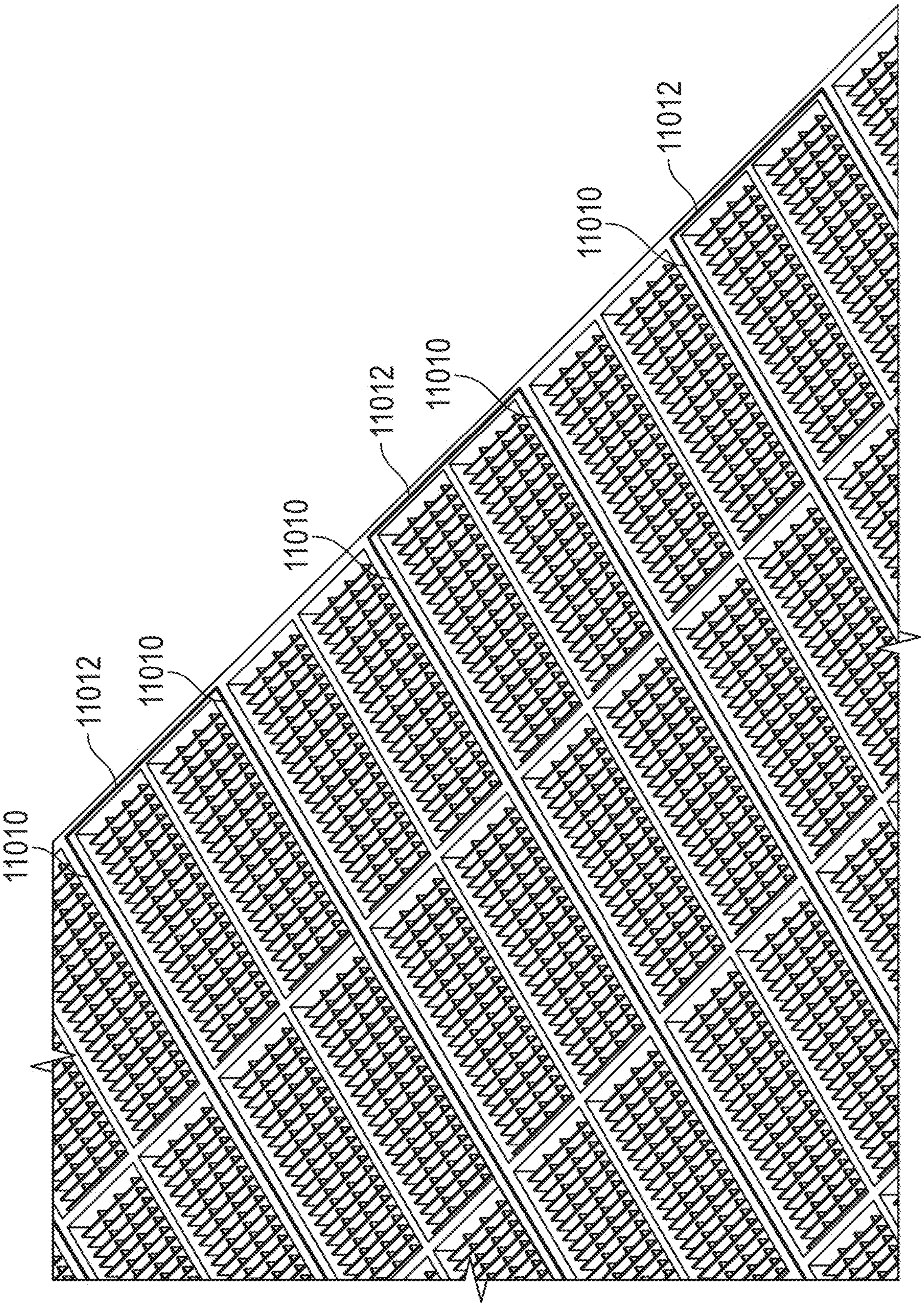
FIG. 9 illustrates a top isometric view of a screen assembly with continuous reinforcement fibers embedded therein, according to an embodiment.

FIG. 9 is a bottom perspective view of a portion of a screen assembly 11000 with a continuous reinforcement fiber embedded therein. In the embodiments shown in FIGS. 5-8, the reinforcement fibers are individual reinforcement fibers that extend the length or width of the screen assembly. Such individual reinforcement fibers are not continuous across multiple rows of screen elements. Instead, each row of screen elements receives its own individual reinforcement fiber or fibers embedded therein, or reinforcement fibers are embedded into the structure between the rows. In such embodiments, each single reinforcement fiber has a first end that extends from a first side or end of the screen assembly and a second end that extends from a second side or end of the screen assembly.

In alternate embodiments, only one or only a few reinforcement fibers may follow a serpentine path that traverses multiple rows of screen elements within a screen assembly or sub-assembly. In the embodiment illustrated in FIG. 9, a continuous reinforcement fiber follows a serpentine path that extends between two adjacent rows of screening openings until the reinforcement fiber reaches the edge of the screen assembly. The reinforcement fiber then turns and traverses over to two new adjacent rows of screening openings and then extends down between the two new adjacent rows of screening openings. This pattern repeats as the reinforcement fiber traces out a serpentine path across the screen assembly.

As shown in FIG. 9, long straight portions 11010 of the reinforcement fiber extend between two rows of screening openings. When the reinforcement fiber reaches the end of the screen assembly, short traversing portions 11012 of the reinforcement fiber traverse over to two new rows of screening openings. A single screen assembly may include one or more continuous reinforcement fibers that extend along a path that has a long direction in the direction of tension and a short direction in a direction other than the direction of tension, such as perpendicular to the direction of tension.

A continuous fiber that traces out a serpentine path may be embedded into a screen assembly as discussed above with respect to FIGS. 5-8. If grooves are molded into the bottom surfaces of the screen elements, the grooves can facilitate embedding one or more continuous reinforcement fibers into the screen assembly in a serpentine pattern. For example, and with reference to FIG. 6, a continuous reinforcement fiber can be laid into an aligned row of grooves 10240 that run along bottom surfaces of side portions 10222 of a row of screen elements so that the reinforcement fiber extends for most of the length or width of the screen assembly. Alternatively, the reinforcement fiber could be laid into an aligned row of grooves 10242 that are formed in the bottom surfaces of the central reinforcement members 10236 of a row of screen elements so that the reinforcement fiber extends for most of the length or width of the screen assembly. When the reinforcement fiber approaches an edge of the screen assembly, the reinforcement fiber can be run through one or more of the grooves 10244 formed on the bottom surface of an end portion 10220 of a screen element to traverse to a different row of screen elements. The reinforcement fiber can then be directed back down an aligned row of grooves 10240 or 10242 on the side portions 10222 or central reinforcement members 10236, respectively of a new row of screen elements.

In some embodiments, stiffening rods may be embedded in the screen assemblies in a direction perpendicular to the orientation of the reinforcement fibers. When the ends of a screen assembly are placed in tension, the screen assembly has a tendency to contract in a direction perpendicular to the tension direction. Stiffening rods that are embedded in the screen assembly and that extend in a direction perpendicular to the tension direction helps to prevent sagging or hammocking of the screen between support members which will underly the screen assembly when it is mounted on a screening machine. The stiffening rods also may help to reduce the contraction, or "hourglassing," of the screen assembly in the direction perpendicular to the tensioning direction. The stiffening rods can be formed from any suitable materials including metal and fiberglass. In some instances, the stiffening rods may be formed of a synthetic or plastic material having a different and harder composition than the synthetic or plastic material used to form the screen elements.

Figure 10:
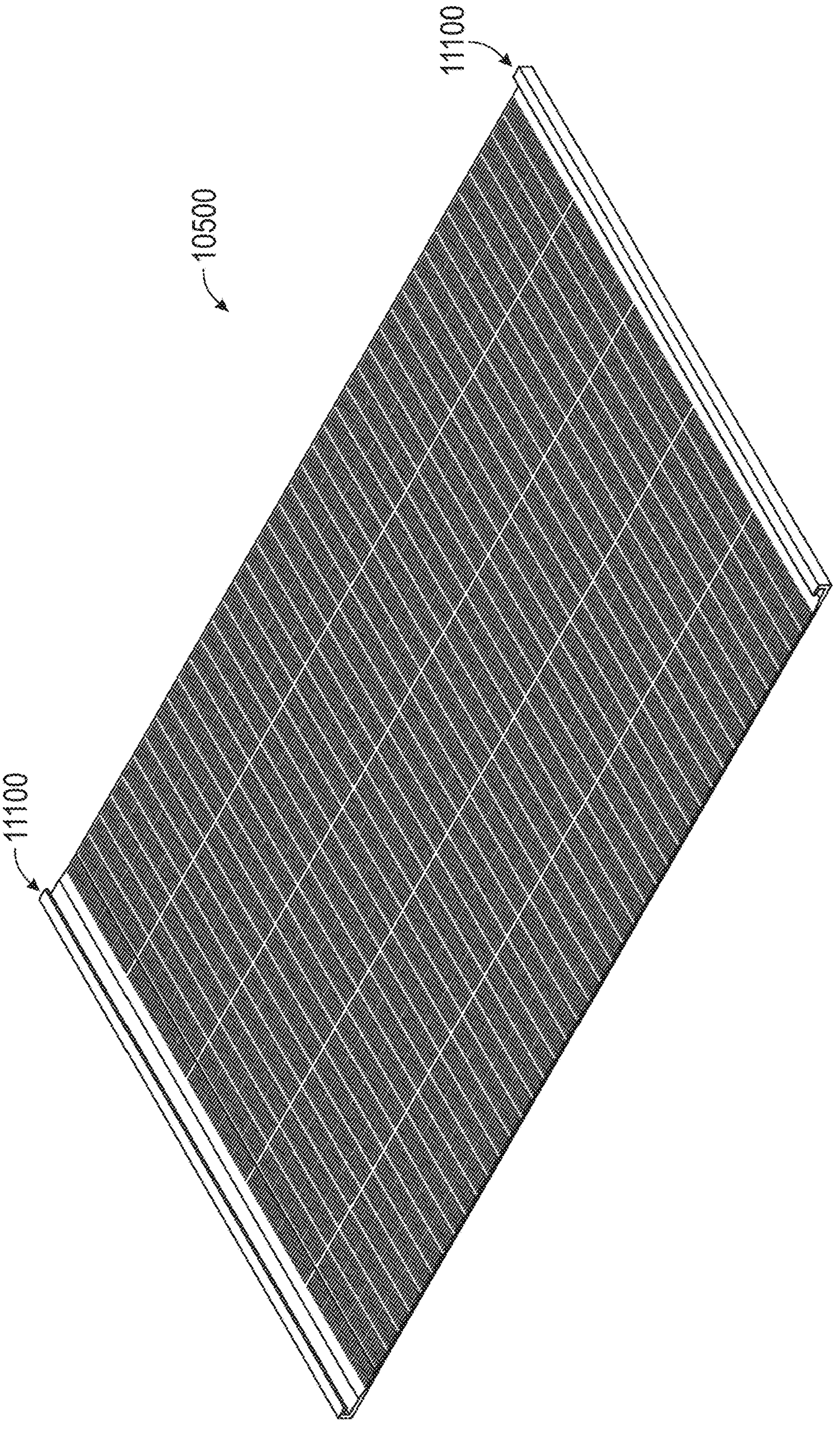
FIG. 10 illustrates an isometric view of a screen assembly with hook strips, according to an embodiment.
Figure 11:
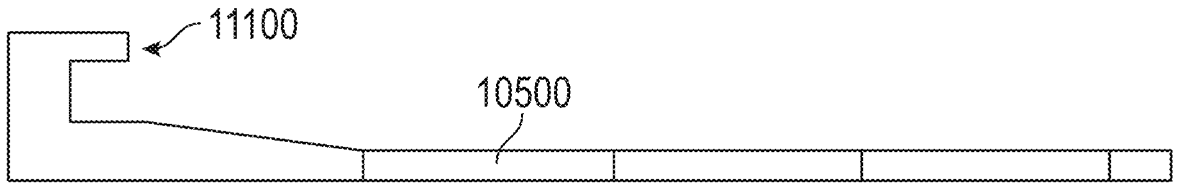
FIG. 11 illustrates a side view of a screen assembly with hook strips, according to an embodiment.

FIG. 10 is an isometric view of a screen assembly 10500 with hook strips 11100 to facilitate mounting the screen assembly on a screening machine. FIG. 11 is a side view of the screen assembly 10500 with hook strips 11100 The hook strips 11100 may be attached on the edges of a screen assembly which are tensioned to secure the screen assembly 10500 to a vibratory screening machine The hook strips 11100 may be attached to the screen assembly 10500 before, during or after the embedding of the reinforcement fibers into the screen assembly. In some embodiments, the hook strips 11100 may be attached to the screen assembly 10500 while the reinforcement fibers are being embedded into the screen assembly 10500.

The hook strips 11100 may extend along opposite edges of the screen assembly and may each have a U-shaped channel that can be attached to a tensioning mechanism. The hook strips 11100 may also be formed with cast-in structural members and/or may include other structural members. Hook strips 11100 may be formed in a U-shape or any other suitable shape for attachment to a vibratory screening machine. In an exemplary embodiment, hook strips 11100 may include a formed member, e.g., a metal member that is bent to a desired shape, e.g., a U-shape. The formed member may be attached to the body of a screen assembly 10500 by heating, pressing, mechanical fasteners, chemical bonding, molding and/or any other suitable attachment method/arrangement.

The hook strip 11100 can be formed of various different materials. In some embodiments, the hook strip 11100 could be formed of a metal material. In other embodiments, the hook strip 11100 could be formed of a synthetic or plastic material. In some embodiments, each hook strip 11100 could be an injection molded element made from thermoplastic. In that event, the hook strip 11100 could be attached to a screen assembly by the melting and joining methods described above in connection with attaching screen elements to each other. Also, in instances where a portion of a hook strip 11100 is molded or formed from a synthetic material, a stiffening element may be embedded in the hook strip 11100 to provide greater structural rigidity. The stiffening element could be formed from any suitable material including metal, fiberglass or carbon fibers.

When provided, ends of the reinforcement fibers running through a screen assembly are attached to the hook strips 11100. Attaching the reinforcement fibers to the hook strips 11100 allows the tensioning forces that are applied by the hook strips 11100 to be partially borne by the reinforcement fibers. This can be accomplished in a variety of different ways.

In some embodiments, the ends of the reinforcement fibers are attached to the hook strips 11100 via an adhesive and/or a mechanical attachment device. If the hook strips 11100 are formed of a molded synthetic material, it may be possible to embed the reinforcement fibers into the material of the hook strips 11100 in much the same way that the reinforcement fibers are embedded into the material of the screen elements that make up the screen assembly, as described above. Indeed, one or more grooves may be molded into the material of the hook strips 11100 to facilitate embedding the reinforcement fibers into the material of the hook strips 11100.

If a screen assembly includes one or more reinforcement fibers that are embedded into the screen assembly in a serpentine fashion, then the hook strips 11100 are attached to the screen elements that make up the edges of the screen assembly in such a way that the tensioning forces applied by the hook strips 11100 can be borne by the embedded reinforcement fiber(s).

Figure 12B:
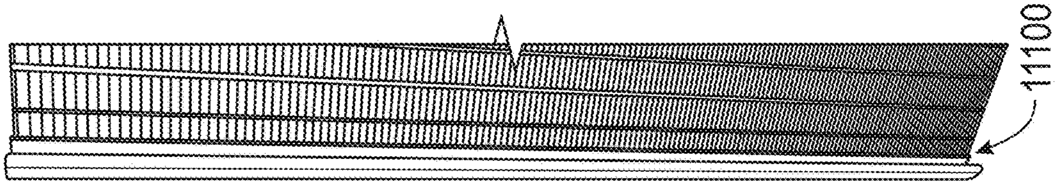
FIG. 12B illustrates an image of an experimental screen assembly, according to an embodiment.
Figure 12A:
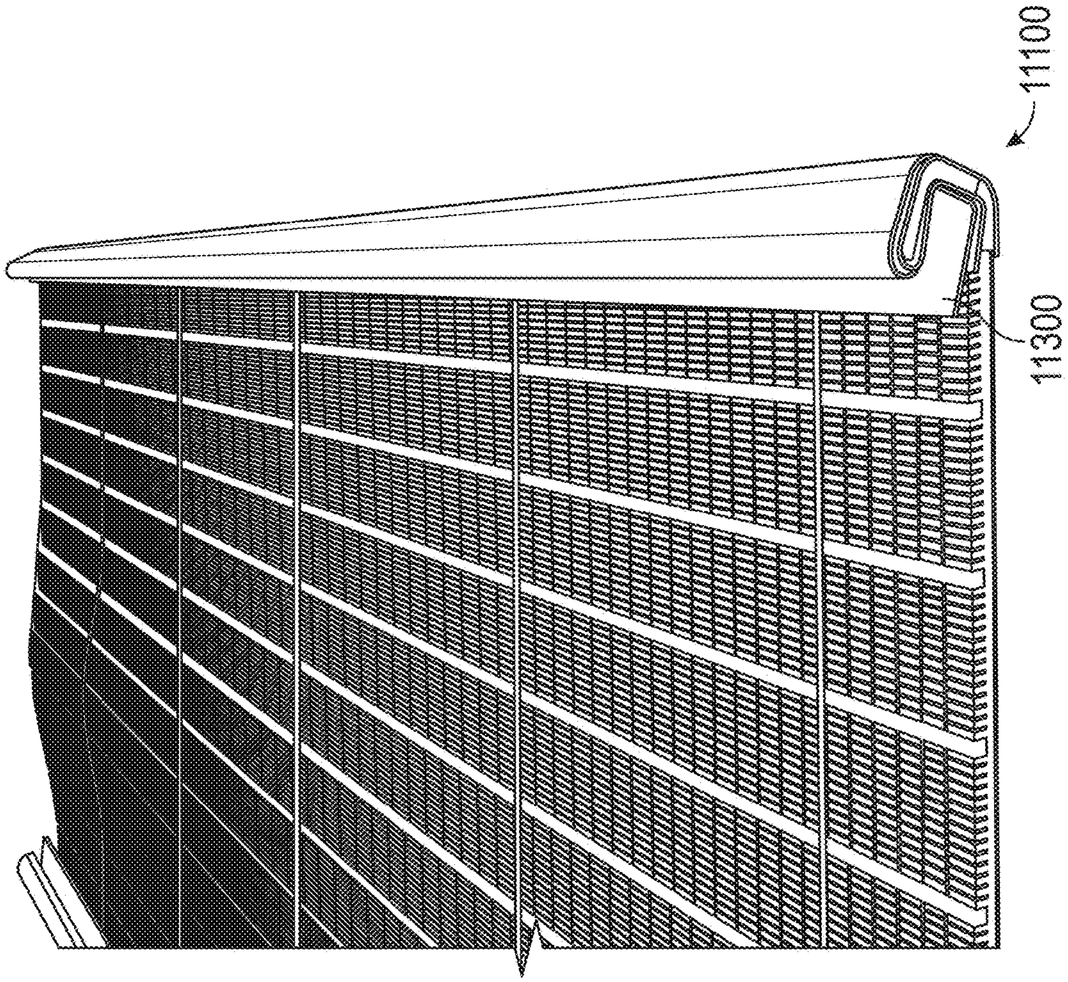
FIG. 12A illustrates an image of an experimental screen assembly, according to an embodiment.

FIGS. 12A and 12B illustrate an embodiment in which a thin metal member 11300 is bent to cover at least the interior of a U-shaped hook strip 11100. The metal member 11300 may extend around the outside and top of the hook strip 11100, around the back of the hook strip 11100 and to the bottom of the hook strip 11100. In some embodiments, such a metal member 11300 is formed in the hook shape and crimped or otherwise attached to the screen assembly to form the hook strip 11100.

In use, a screen assembly 10500 is mounted on a vibratory screening machine in a well-known manner. More specifically, the screen assembly 10500 is mounted on a screen deck bed of a vibratory screening machine. Channel-shaped draw bars of a tensioning mechanism of the vibratory screening machine are received within the hook strips 11100, and the draw bars tension the screen assembly to secure the screen assembly 10500 to the screen deck of the vibratory screening machine. The tension applied by the draw bars also serves to hold the screen assembly 10500 motionless with respect to the screen deck while the screen deck and attached screen assembly 10500 are vibrated during screening operations.

Figure 13:
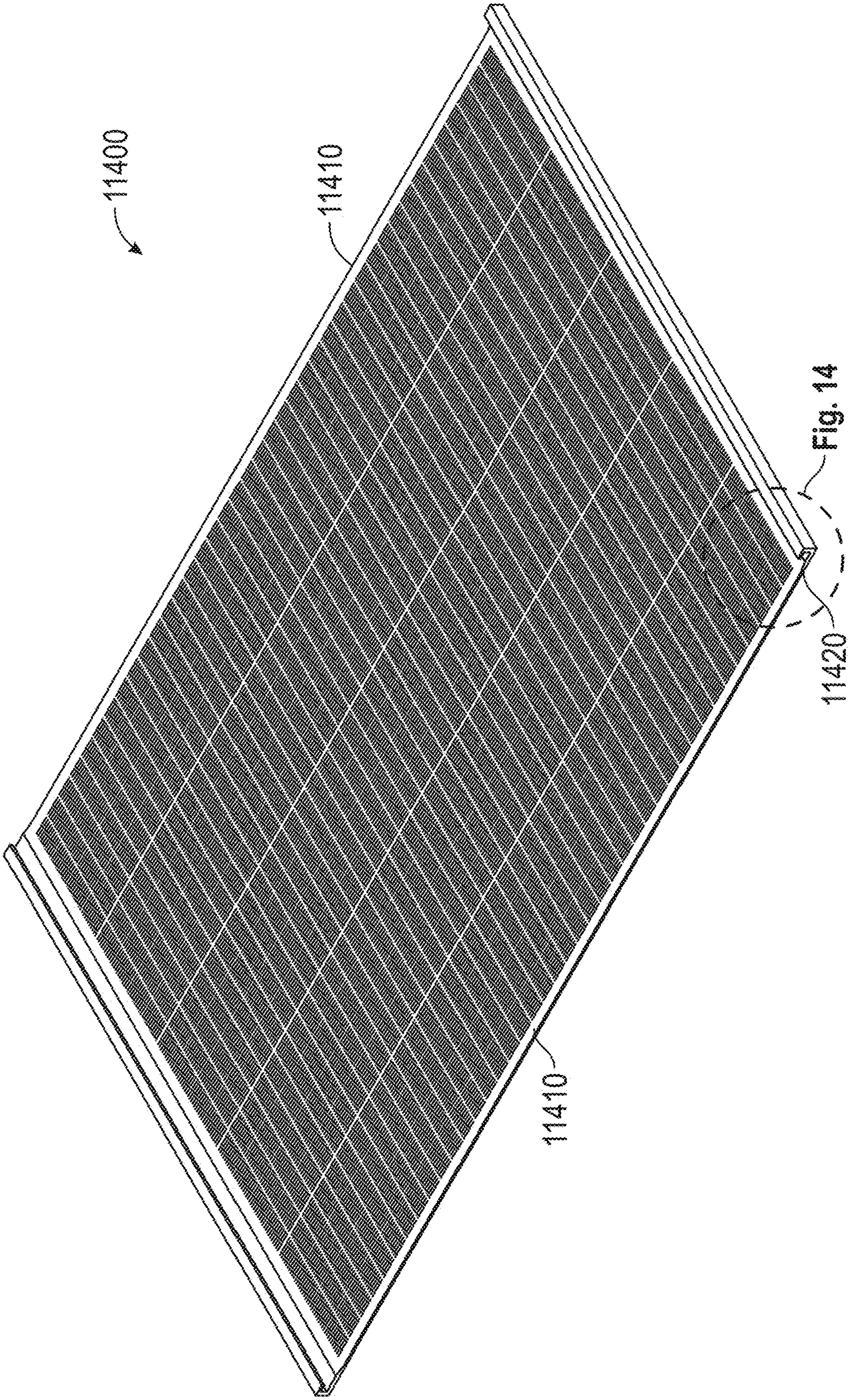
FIG. 13 illustrates a top view of screen assembly with boarders, according to an embodiment.
Figure 14:
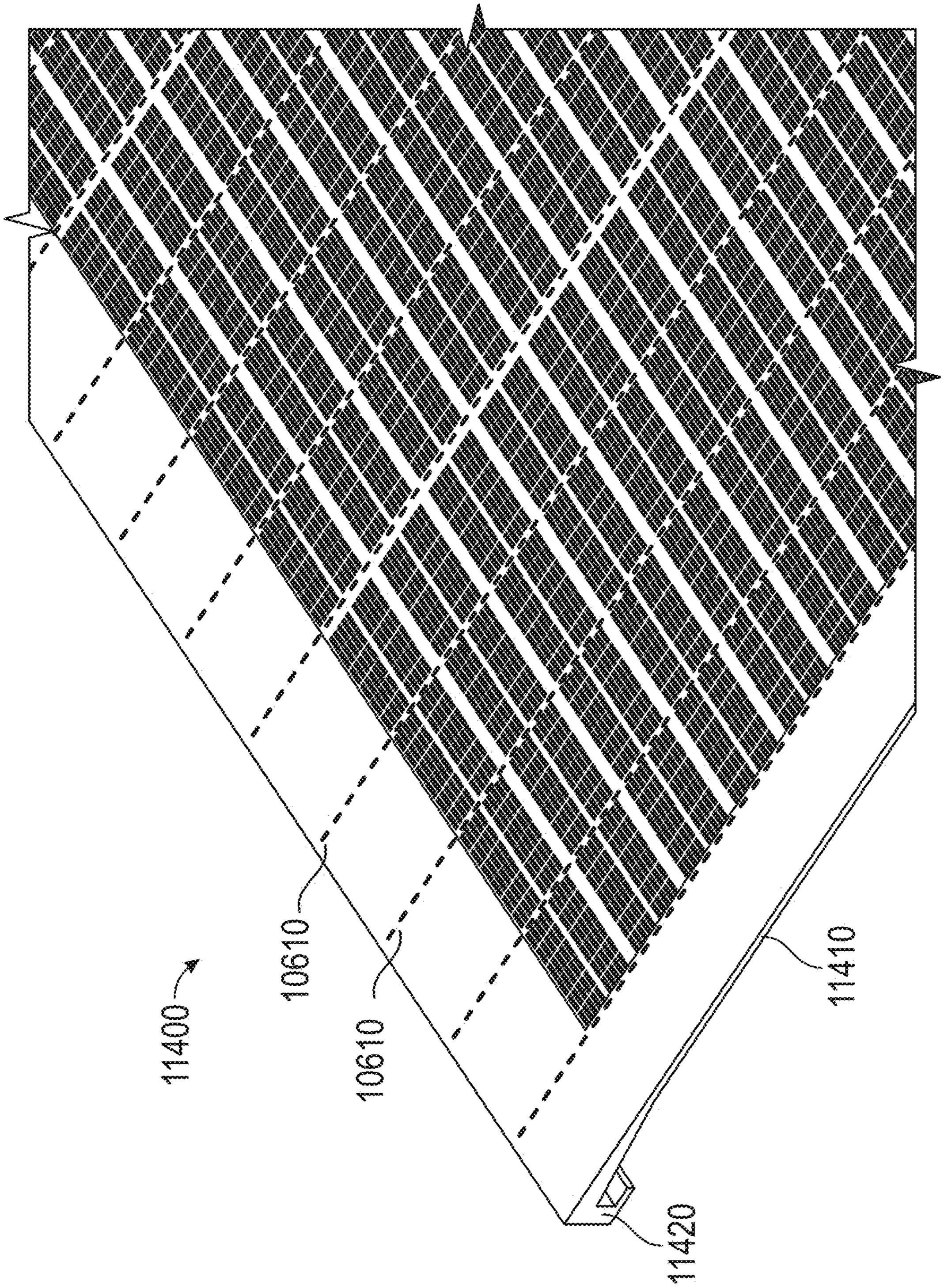
FIG. 14 illustrates a detail view of the screen assembly of FIG. 13, according to an embodiment.

FIG. 13 illustrates a top perspective view of a screen assembly 11400 with end borders 11410. FIG. 14 is a bottom perspective view of a corner of the screen assembly 11410 shown in FIG. 13. The screen assembly 11400 is configured for side-to-side tensioning with the hooks 11420 located at the sides of the screen assembly 11400. The hooks 11420 extend above a top surface of the screen assembly 11400. The end borders 11410 may be made of the same thermoplastic material as the screen elements. In some embodiments, the end borders 11410 are made of different material than the screen elements. In some embodiments, the end borders 11410 are made of TPU material. The end borders 11410 may be added to the screen assembly before, after, or when the hook strips 11420 are added to the screen assembly 11400.

FIG. 14 illustrates that multiple reinforcement fibers 10610 are embedded in the material of the screen assembly 11400. In this embodiment, the ends of the reinforcement fibers 10610 are also embedded in the hooks 11420 that are present on the sides of the screen assembly 11400. As a result, a tensioning force that is applied to the hooks 11420 by a tension mounting mechanism is directly conveyed to and borne by the reinforcement fibers 10610. Of course, in alternate embodiments the reinforcement fibers 10610 could be attached to the hooks 11420 via alternate attachment means, as discussed more fully above.

The end borders 11410 provide an interface between adjacent screens when installed on a screening machine. The end borders 11410 may add to the length of the screen assembly 11400 such that the dimensions of a completed screen assembly or assemblies are compatible with the dimensions of a screening machine that uses the screen assemblies. The end borders 11410 also may provide protection for the edges of the outermost screen elements. Although the screen elements are robust with respect to screening materials, they are suspectable to damage from impacts on their edges. The end borders 11410 provide protection from such impacts and other damage to the edges.

Figure 15:
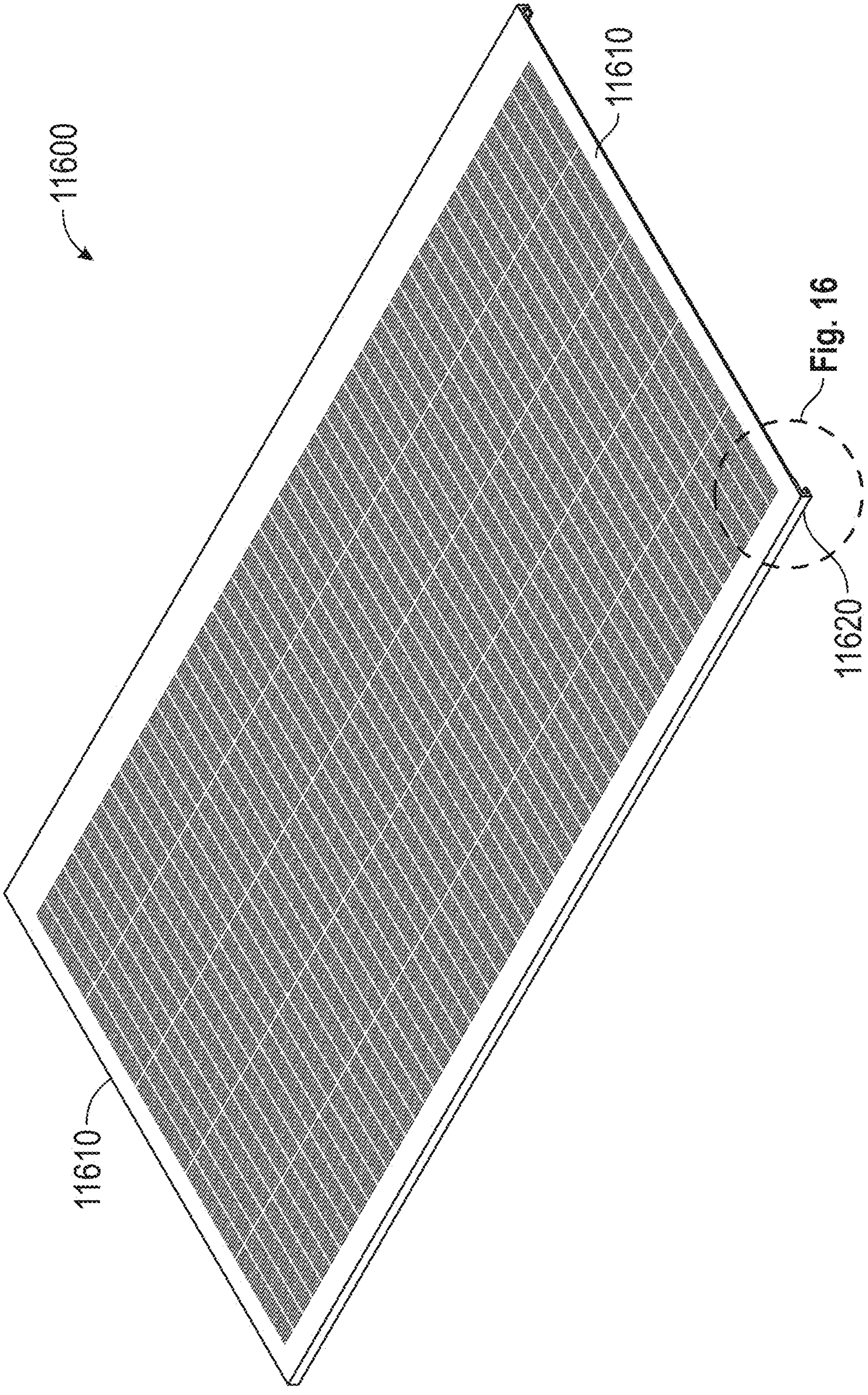
FIG. 15 illustrates a top view of screen assembly with boarders, according to an embodiment.
Figure 16:
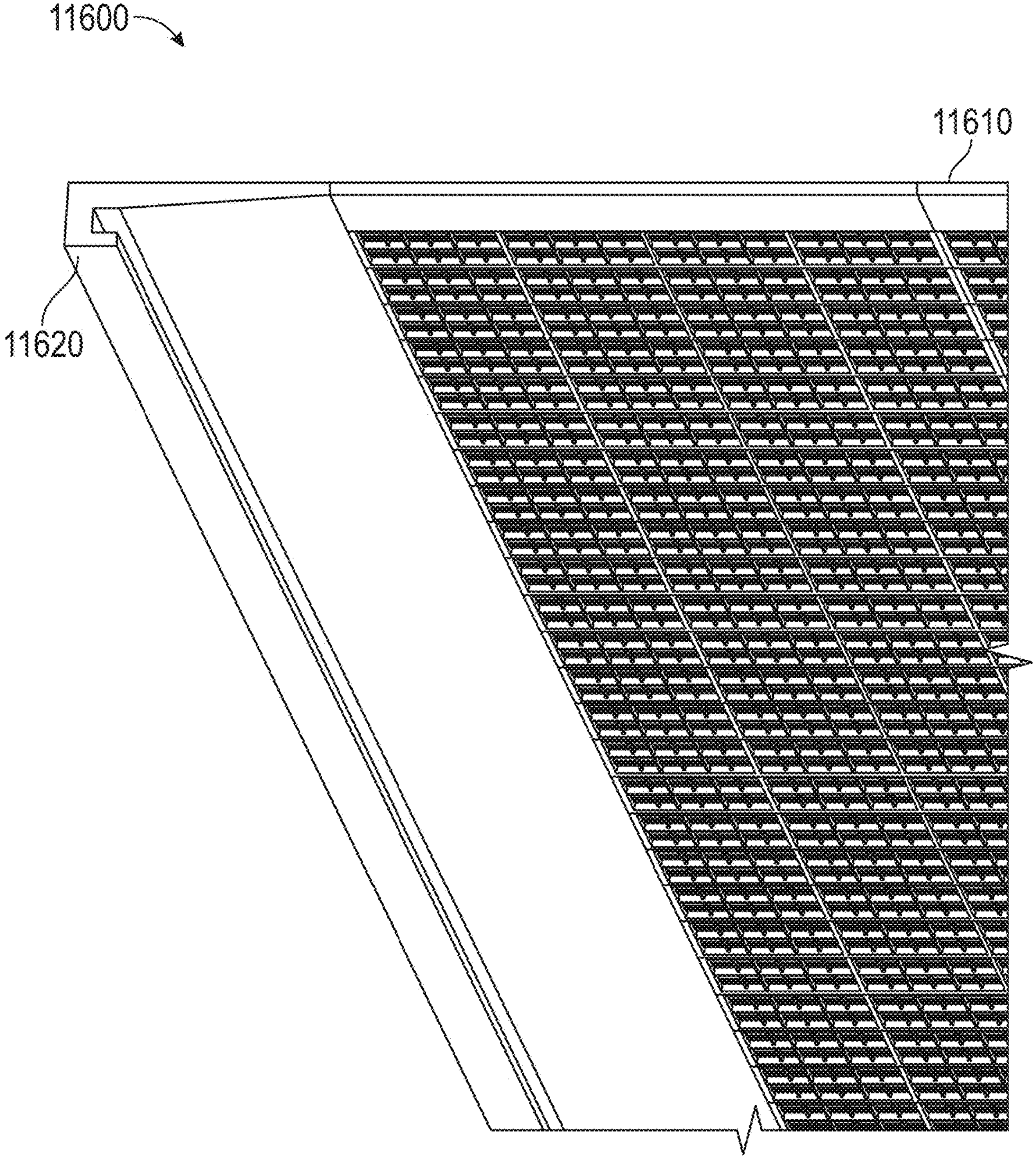
FIG. 16 illustrates a detail view of the screen assembly of FIG. 15, with reinforcement fibers omitted, according to an embodiment.

FIG. 15 is a top perspective view of a screen assembly 11600 with side borders 11610. FIG. 16 is a bottom perspective view of a corner of the screen assembly 11600 illustrated in FIG. 15. The screen assembly 11600 is configured for end-to-end tensioning with the hooks 11620 located at the ends of the screen assembly 11600. The hooks 11620 extend below a bottom surface of the screen assembly 11600. The side borders 11610 may be made of the same thermoplastic material or materials as discussed with respect to the end borders 11410 of the embodiment depicted in FIGS. 13 and 14. The side borders 11610 may be added to the screen assembly 11600 before, after, or when the hook strips 11620 are added to the screen assembly 11600. As with end borders 11410 of the previous embodiment, the side borders 11610 of this embodiment may provide protection for the edges of the outermost screen elements. Although the screen elements are robust with respect to screening materials, they are suspectable to damage from impacts on their edges. The side borders 11610 provide protection from such impacts and other damages to the edges.

Figure 17A:
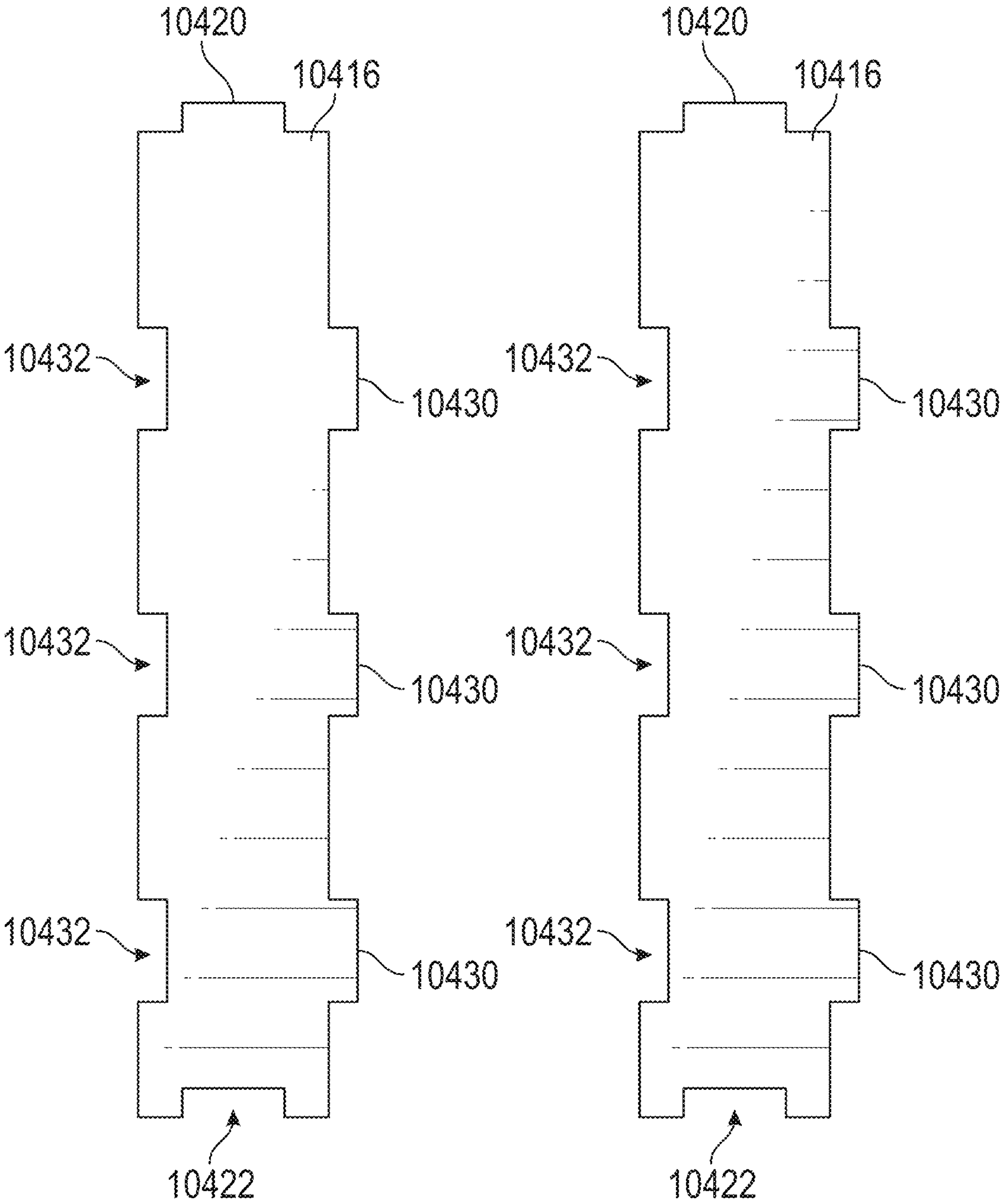
FIG. 17A illustrates two screen elements having a first design that facilitates joining the side edges.

FIG. 17A illustrates two screen elements 10416 that have been injection molded to include end protrusions 10420 and end recesses 10422. The screen elements also include side protrusions 10430 and side recesses 10432. The protrusions and recesses are designed so that when the side edges or end edges of two screen elements 10416 are brought into contact with one another just prior to being welded or joined together, the protrusions are received in the recesses. As a result, the two screen elements are well aligned with one another. In other words, the protrusions and edges can help to ensure that the screen elements are properly aligned with each other before they are joined to one another.

Figure 17B:
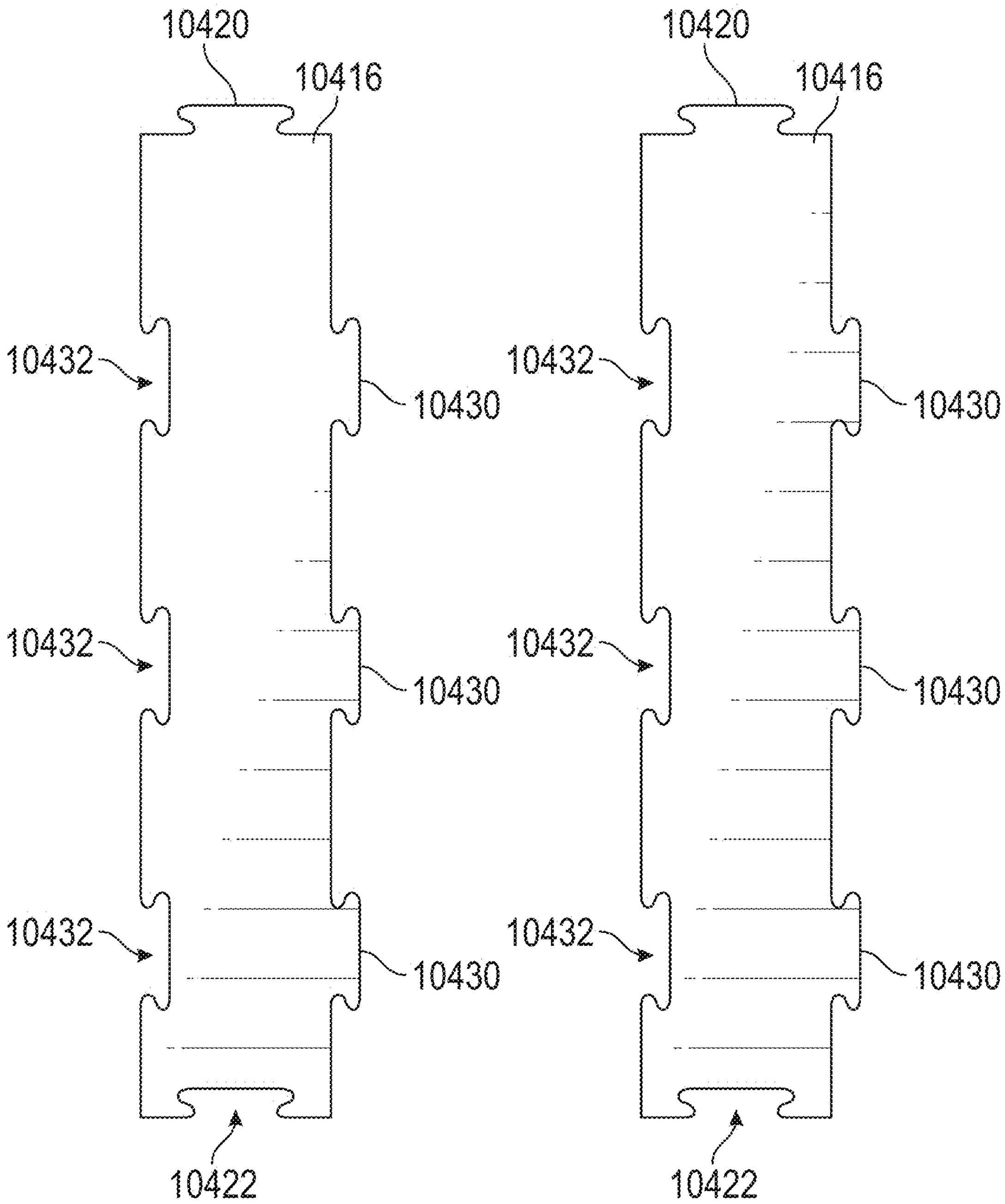
FIG. 17B illustrates two screen elements having a second design that facilitates joining the side edges

FIG. 17B shows an alternate embodiment where the protrusions 10420, 10430 have a shape which has a larger width at the ends than at the base. The recesses 10422, 10432 have corresponding shapes. When two such screen elements are brought together the protrusions 10420, 10430 would be pressed down into the recesses 10422, 10432 and the shapes of the protrusions and recesses would hold the two screen elements together. The shaped protrusions 10420, 10430 and recesses 10422, 10432 would help hold multiple screen elements together during the process of bonding them together.

Figure 18:
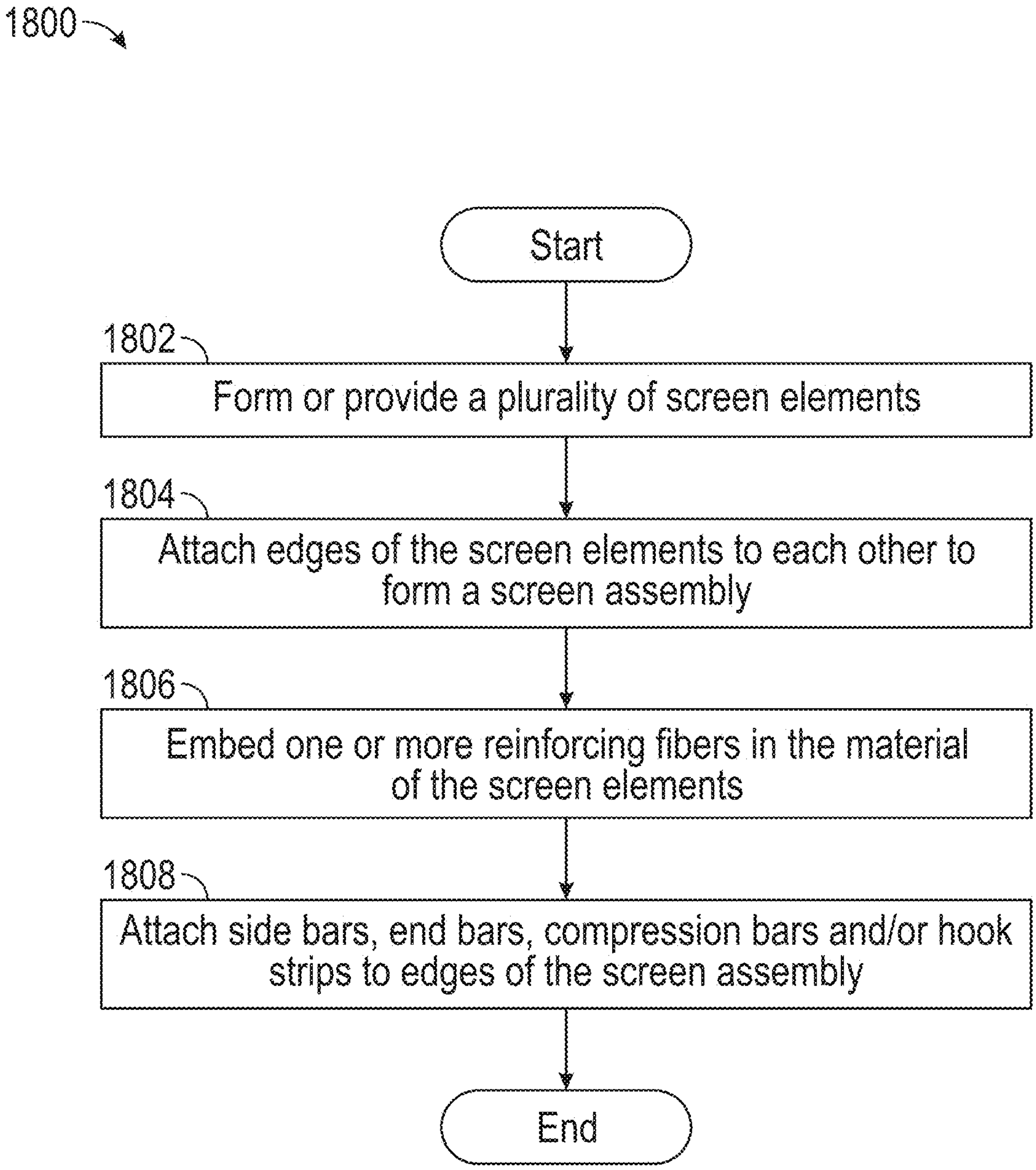
FIG. 18 illustrates steps of a first method of fabricating a screen assembly, according to an embodiment.

FIG. 18 illustrates steps of a first method 1800 of forming a screening assembly. The method begins and proceeds to step 1802 where a plurality of screen elements are provided or are formed. Forming screen elements may include injection molding a plastic or synthetic material to form screen elements. The screen elements may have the characteristics described above, and in particular the characteristics of the screen elements described in connection with FIGS. 1A-2.

Next, in step 1804 side edges of the screen elements are attached to one another to form a screening assembly. The side edges can be joined by various different methods that include fusing the material of the side edges together, bonding or gluing, the use of fasteners and other similar methods. In some embodiments, attaching the side edges of plastic or synthetic screen elements can include heating the edges that will be joined to cause the material at the side edges to at least partially melt, pressing the side edges together, and allowing the material to cool so that the material along the side edges is fused together. The material of the side edges can be at least partially melted as described above. Of course, the side edges can also be joined in a variety of other ways.

In some instances, the method would end after step 1804. In other words, once a sufficient number of screen elements are attached to one another to form a screen assembly having the required size, the method could end and the screen element can be used.

In alternate embodiment, an additional step 1806 is formed to embed one or more reinforcing fibers in the material of one or more of the screen elements. As explained above, reinforcing fibers can be arranged so that they extend in a direction in which the screen assembly will be tensioned in order to secure the screen assembly to a screening machine. The reinforcing fibers can be embedded in the material of the screen elements in various ways, as described above. This can include heating the material of selected portions of selected ones of the screen elements so that the material at least partially melts and pressing a reinforcing fiber into the melted material.

In some embodiments, a plurality of reinforcing fibers are embedded in the material of the screen elements of a screening assembly. In other embodiments one or only a few reinforcing fibers are embedded in the material of the screen elements of a screening assembly in a serpentine fashion so that the one or few reinforcing fibers extend throughout multiple portions of the screen assembly.

In some embodiments, one or more reinforcing fibers are embedded in the material of a screening assembly along seams formed between side edges of the screen elements that make up the screen assembly. This can be accomplished as described in greater detailed below in connection with FIG. 8.

In some embodiments, the method will end after step 1806. In other instances, an optional additional step 1808 is performed, where side bars, end bars, compression bars or hook strips are attached along one or more edges of the screen assembly. The side or end bars can be provided to protect what would otherwise be exposed side edges of the screen elements along one exterior edge of the screen assembly. A compression bar could be mounted to an edge of the screen assembly to facilitate compression mounting a screen assembly to a screening machine. Likewise, hook strips could be attached to opposite side edges or opposite end edges of a screen assembly so that the screen assembly can be mounted to a screening machine with a tension mounting system.

The side bars, end bars, compression bars and/or hook strips could be attached to the screen elements of the screen assembly in various ways. Attachment could be accomplished by crimping, mechanical fasteners, chemical or adhesive bonding, or by fusing the material of the screen elements to the material of side bars, end bars, compression bars and hook strips.

Figure 19:
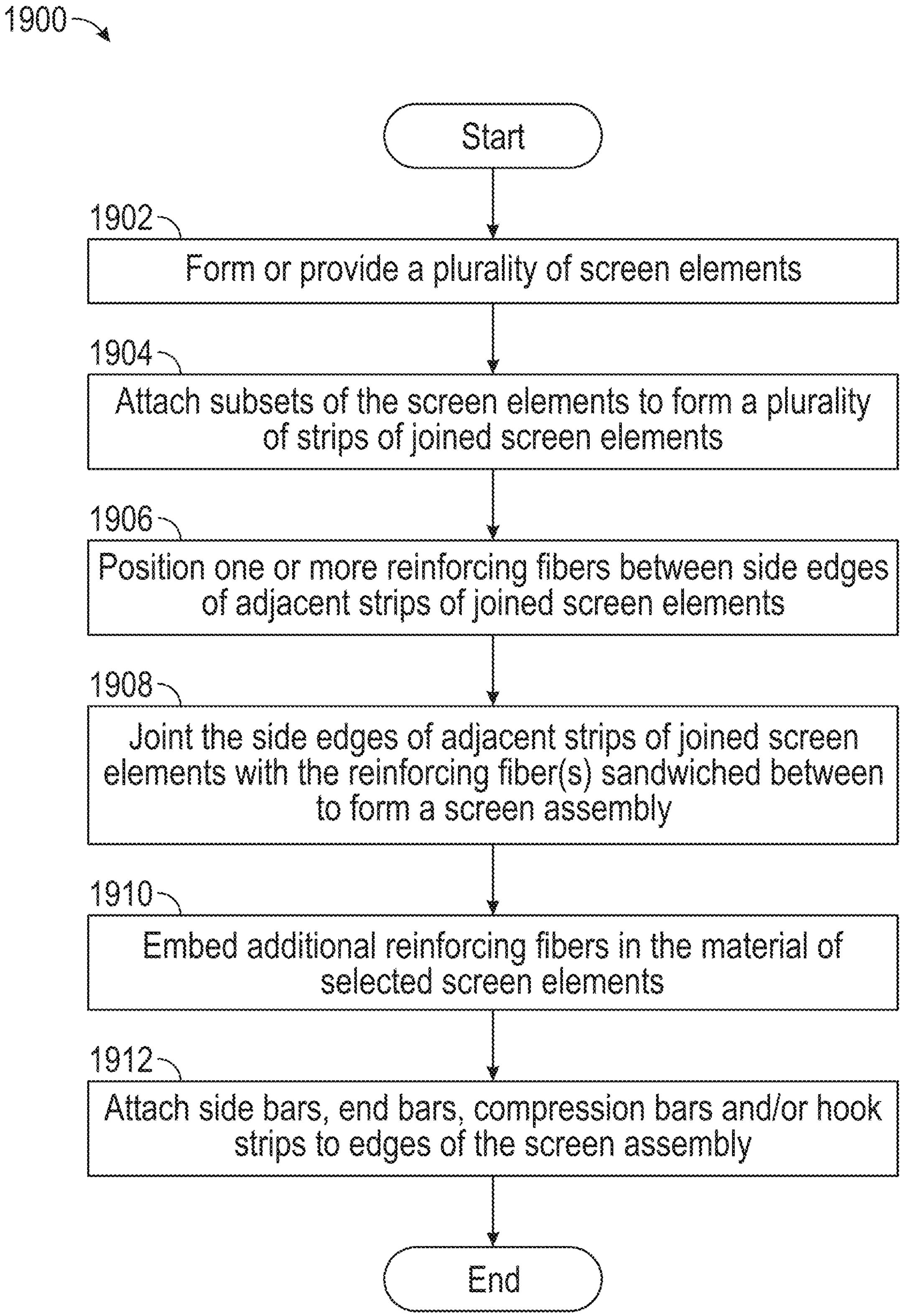
FIG. 19 illustrates steps of a second method of fabricating a screen assembly according to another embodiment.

FIG. 19 illustrates steps of another method 1900 of forming a screening assembly. In this method, reinforcing fibers are embedded into the structure while the side edges of the screen elements are joined together. The method 1900 begins and proceeds to step 1902, where a plurality of screen elements are provided or are formed. Here again, forming screen elements may include injection molding a plastic or synthetic material to form screen elements. The screen elements may have the characteristics described above, and in particular the characteristics of the screen elements described in connection with FIGS. 1A-2.

In step 1904 subsets of the screen elements are attached to each other to form strips of joined screen elements. This can include joining elongated screen elements end-to-end to form the strips of joined screen elements. The screen elements can be attached to each other in any of the ways previously described.

In step 1906 one or more reinforcing fibers are positioned between the side edges of two strips of joined screen elements. In step 1908 the side edges of two adjacent strips of joined screen element are attached to one another, sandwiching the one or more reinforcing fibers in between the strips of joined screen elements. This can be accomplished by heating the material of the screen elements along the side edges until the material begins to melt or turn from a solid to a liquid. The side edges of the adjacent strips of joined screen elements are then pressed together with the one or more reinforcing fibers sandwiched between the side edges. The material of the screen elements along the side edges is then allowed to cool. As a result, the material of the side edges of the screen elements is fused together to join the strips of joined screen elements. Also, the reinforcing fiber or fibers end up being embedded in the material of the screen elements along the joint or seam formed between the side edges of the strips of joined screen elements. Of course, the strips of joined screen elements can be attached to one another in various other ways, such as with an adhesive or with mechanical fasteners.

The above-described process can be repeated multiple times to add additional strips of joined screen elements to the first two strips of joined screen elements, embedding one or more reinforcing fibers between the existing structure and the new strip of joined screen elements each time a new strip is added. This process allows one to construct a large screen assembly, one strip at a time. In some embodiments, the method ends once a sufficient number of strips of joined screen elements have been attached to one another. In other embodiments, options additional steps can be performed.

In a first optional step 1910, additional reinforcing fibers can be added to a screening assembly after all the strips of joined screen elements have been attached to one another. This could be accomplished by heating selected portions of the screen elements to cause those portions to at least partially melt. One or more reinforcing fibers are then pushed into the heated portions of the screen elements, and the heated portions are allowed to cool and harden. In preferred methods, the reinforcing fibers are inserted far enough into the heated portions of the screen elements that the reinforcing fibers will be fully encapsulated in the material of the screen elements once the material cools and hardens. This optional step 1910 can be performed to add additional reinforcing fibers to the screen assembly at locations between the joints or seams joining the strips of screen elements where other reinforcing fibers are located.

In another optional step 1912, side bars, end bars, compression bars or hook strips are attached along one or more edges of the screen assembly. The side or end bars can be provided to protect what would otherwise be exposed edges of the screen elements along one exterior edge of the screen assembly. A compression bar could be mounted to an edge of the screen assembly to facilitate compression mounting a screen assembly to a screening machine. Likewise, hook strips could be attached to opposite side edges or opposite end edges of a screen assembly so that the screen assembly can be mounted to a screening machine with a tension mounting system.

Here again, step 1912 could include the side bars, end bars, compression bars and/or hook strips being attached to the screen elements of the screen assembly in various ways. Attachment could be accomplished by crimping, mechanical fasteners, chemical or adhesive bonding, or by fusing the material of the screen elements to the material of side bars, end bars, compression bars and hook strips.

When a screen assembly is made as described above, where side edges of screen elements are bonded or fused together, it is possible to repair a damaged section of the screen assembly. For example, if a section of the screen assembly is damaged during use, it is possible to cut out the damaged section and to replace it with a correspondingly sized new section of new screen elements. This could involve cutting out a strip of screen elements that were joined end-to-end and that extend from one side of the screen assembly to the other, where the removed strip includes the damaged section. A similar sized strip of new screen elements that are also joined end-to-end could then be attached to the edges of the remaining portions of the screen assembly in essentially the same way that a screen assembly is made in the first place. The result is a repaired screen assembly that includes a new strip of new screen elements. It would be impossible to conduct this sort of repair on a thermoset screen because once the thermoset material has cured, the edges can no longer be joined to a new repair patch via melting and fusing.

Ideally, a new strip of screen elements that is inserted into a screen assembly to replace a damaged section will include corresponding reinforcement fibers. If that is the case, it may be possible to attach the reinforcement fiber or fibers to the hook ends of the screen assembly that are used to mount the screen assembly to a screening machine.

In some instances where a strip of screen elements is replaced, it may not be possible to include reinforcement fibers in the new strip that is inserted into the screen assembly to replace the damaged section. Similarly, it may not be possible to join ends of one or more reinforcement fibers in the new section to hook ends that are used to mount the screen assembly to a screening machine. That may be acceptable, as the remaining reinforcement fibers may provide sufficient strength to the screen assembly.

In other instances, it may be possible to attach a reinforcement fiber associated with a newly inserted repair strip to the hook ends. This could be accomplished by a heating and fusing operation, via adhesives or via a mechanical attachment mechanism.

When a screen assembly is attached to a screening machine and used to screen materials, one ideally wants the material to be screened to be exposed to the portions of the screen elements that include screening openings as much as possible. When the material to be screened is simply resting against or being vibrated against side portions, end portions and reinforcement members of the screen elements, no screening activity can occur. One way to help keep the material to be screened in contact with the portions of the screen elements that have screening openings is to form the screen assembly such that portions of the screen assembly that do not include screening openings are raised relative to the portions of the screen assembly that include screening openings.

FIG. 2 illustrates three screen elements **10216*a*, 10216*b* and 10216*c* that are joined along their edges at seams 10310**. As explained above, during the joining process the side edges of the screens are heated and pressed together. This causes the material at the edges to fuse together to attach the screen elements to each other.

Figure 20A:
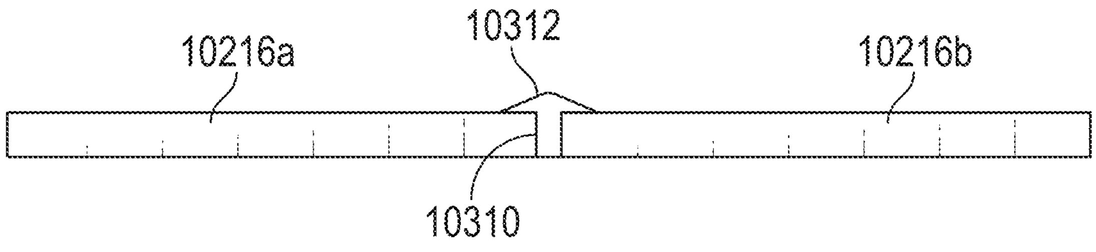
FIGS. 20A and 20B illustrate a seam between two adjacent screen elements that include protruding portions formed along the seam.

FIG. 20A is side a side view of an assembly depicted in FIG. 2. A side edge of the first screen element **10216*a* is joined to a side edge of the second screen element 10216*b* along a seam 10310. However, in this embodiment once the side edges of the screens have been heated to the melting point, the force pushing the side edges together was sufficiently great that some of the material of the side edges was pushed upward at the seam 10310. Once the material of the screen elements 10216*a*, 10216*b* cooled, the result was a top protruding portion 10312 that extends upward along the seam 10310 joining the side edges. This sort of a configuration could result when the two screen elements 10216*a*, 10216*b*** are resting on a flat surface when the edges are bonded together such that the material of the edges can only protrude upward in response to the forces pushing the screen elements together.

If an entire screen assembly is formed to have top protruding portions 10312 along the joints 10310 that attach strips of the screen elements together, there will be raised portions between the portions of the screen elements that include the screening openings. This will tend to cause the material to be screened to rest in the portions between the top protrusions 10312 where the screening openings are located, thereby aiding the screening process.

Figure 20B:
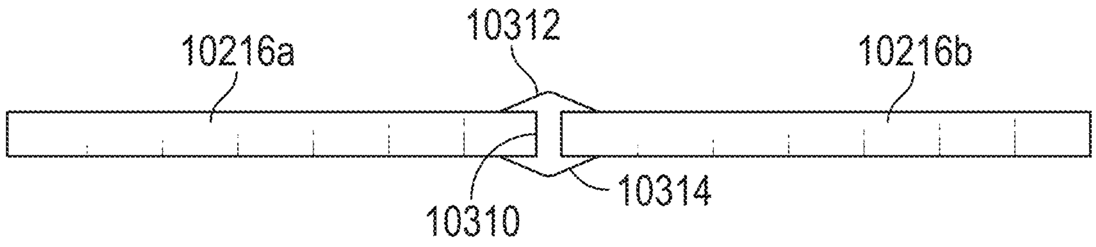

FIG. 20B illustrates an alternate embodiment where a bottom protrusion 10314 is also formed along the bottom surface of the seam 10310. This configuration may be advantageous because once the screen assembly is mounted on a screen deck of a screening machine, the bottom protrusions 10314 may cause the seams 10310 between the screen elements to be pushed upward, further elevating the top protrusions 10312 above the portions of the screen elements that include the screening openings.

The top protrusions 10312 and bottom protrusions 10314 may also be formed via alternate means. For example, once a set of screen elements are joined together by one of the processes described above, a top protrusion 10312 and/or a bottom protrusion 10314 could be an independent element that is added along the seams 10310 between the screen elements. The material of the independent element that forms the top protrusion 10312 and/or bottom protrusion 10314 could be made of the same material as the screen elements, in which case the independent element could be joined to the screen elements along the seams 10310 using methods similar to those discussed above that are used to join the screen elements together. Alternatively, the independent elements that form the top protrusion 10312 and/or bottom protrusion 10314 could be joined to the screen elements along the seams 10310 via alternate means, such as by an adhesive. Also, the independent elements that form the top protrusion 10312 and/or bottom protrusion 10314 could be formed of a different type of material than the material used to form the screen elements.

The foregoing embodiments mainly contemplated screen assemblies that are to be mounted to a screening machine by a tensioning mounting mechanism. One alternate way of mounting a screen assembly to a screening machine is via a compression mounting mechanism. It is possible to use the screen assemblies that are manufactured as described above on a screening machine that includes a compression mounting mechanism so long as the screen assembly includes a support plate.

Figure 21:
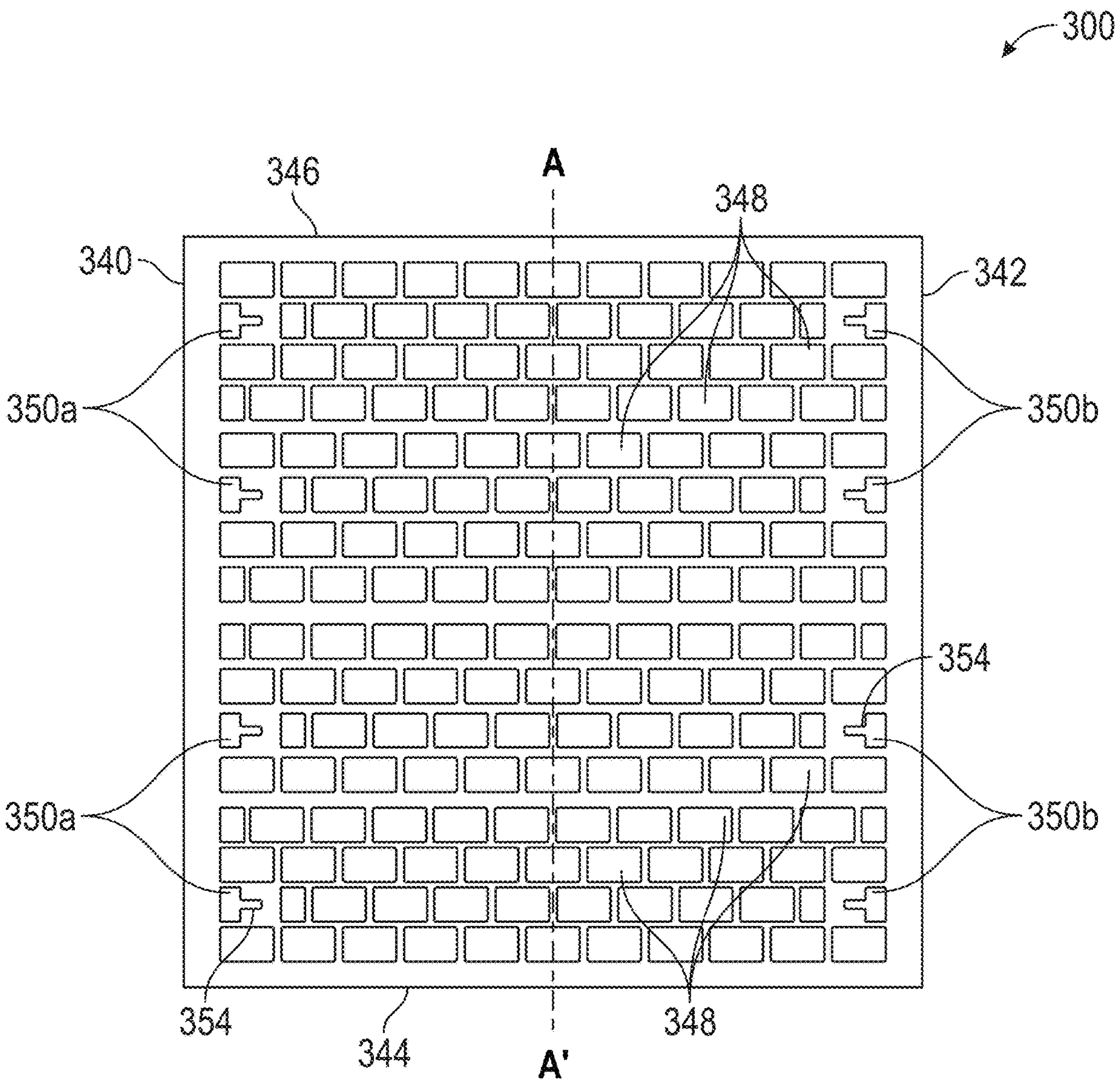
FIG. 21 is a top view of a support plate that can be incorporated into a screen assembly.

FIG. 21 illustrates a support plate 300 that can be incorporated into a screen assembly that can be mounted to a screening machine via a compression mounting mechanism. The support plate includes a front edge 344, a rear edge 346, a first side edge 340 and a second side edge 342. A plurality of apertures 348 are formed across the majority of the surface of the support plate 300. When a layer of screen elements with screening openings is mounted on top of the support plate 300, particles of a material being screened that pass through the screening openings of the screen elements can pass through the support plate 300 via the apertures 348.

The support plate includes a first plurality of mounting apertures 350*a* located along the first side edge 340 and a second plurality of mounting apertures 350*b* that are located along the second side edge 342. Each mounting aperture 350*a*, 350*b* may include an alignment notch 354. The mounting apertures 350*a*, 350*b* interact with elements of the compression mounting system to attach a screen assembly that incorporates the support plate 300 onto a screening machine.

The support plate 300 could be formed of metal or synthetic materials. If the support plate 300 is formed from a synthetic material, stiffening elements could be incorporated into or attached to the support plate to provide increased rigidity to the support plate.

Figure 22:
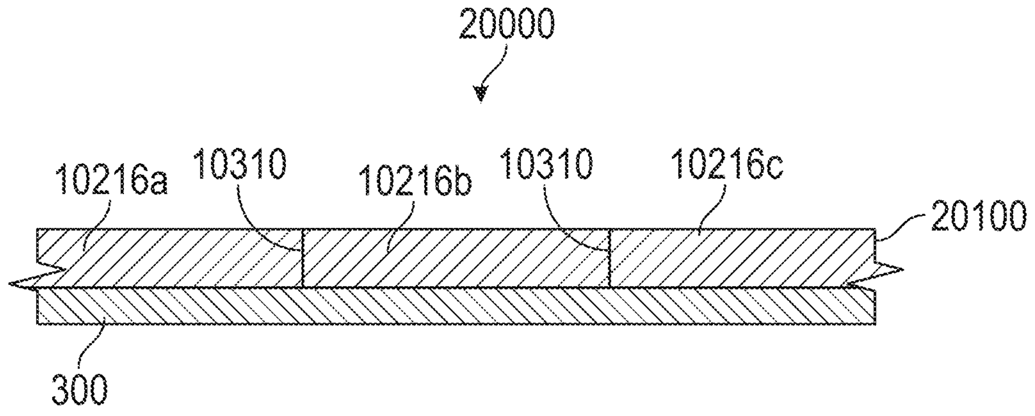
FIG. 22 is a cross-sectional view of a portion of a screen assembly that includes a support plate.

FIG. 22 illustrates a cross-sectional view of a portion of a screen assembly 20000 that includes a support plate 300 as illustrated in FIG. 21. The screen assembly 20000 includes a screening layer 20100 that is formed of a plurality of screen elements 10216*a*, 10216*b* and 10216*c* that have been joined along their side edges at seams 10310 as discussed above. Any of the foregoing embodiments where multiple screen elements are joined together along their side and/or end edges could form the screening layer 20100.

The screening layer 20100 can be attached to the support plate 300 in a variety of different ways. In some embodiments, an adhesive, mechanical fasteners, clamps or other devices could be used to attach the screen elements of the screening layer 20100 to the top surface of the support plate 300. In other embodiments, the material of the screen elements of the screening layer 20100 could be melted and fused to the material of the support plate 300. This might be advantageous when the support plate is formed from a synthetic material.

Figure 23:
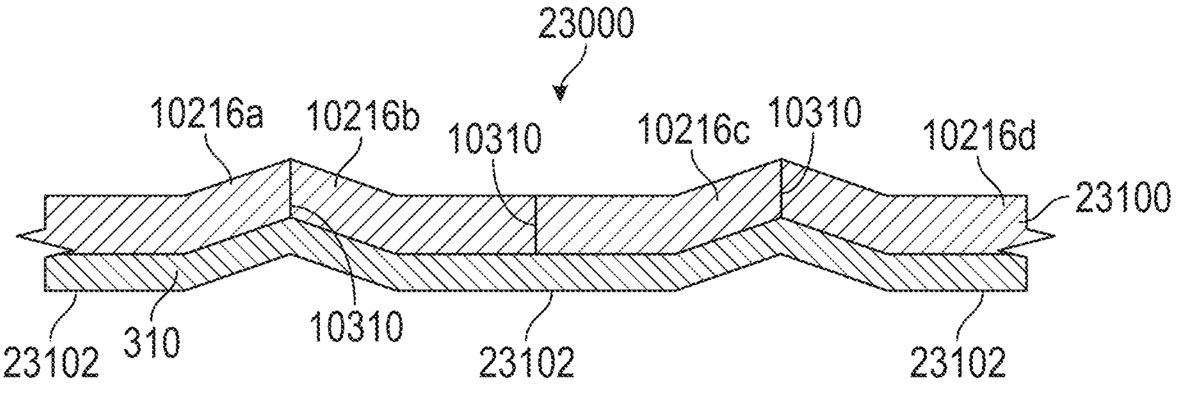
FIG. 23 is a cross-sectional view of a portion of a screen assembly that includes undulations.

FIG. 23 is a cross-sectional view of an alternate embodiment of a screen assembly 23000 that includes a support plate 310. The screening layer 23100 is made of multiple screen elements 10216*a*, 10216*b*, 10216*c*, 10216*d* that are joined along their side edges at seams 10310. In this embodiment, the support plate 310 includes undulations. The screening layer 23100 is sufficiently flexible that it can be bonded to the top surface of the support plate 310 so that the screening layer follows the contours of the support plate 310. By forming a screening assembly as depicted in FIG. 23 it is possible to increase the total screening area per unit width of the screen assembly.

Although the embodiment illustrated in FIG. 23 includes pointed undulations, other shapes are also possible. For example, the support plate 310 and screening layer 23100 could have smoothly rounded undulations. Likewise, the flat portions 23102 between undulations could be eliminated such that the entire screen assembly is a series of undulations. Also, the undulations could extend both upward and downward from a central plane. Any combinations of shapes are possible.

Figure 24A:
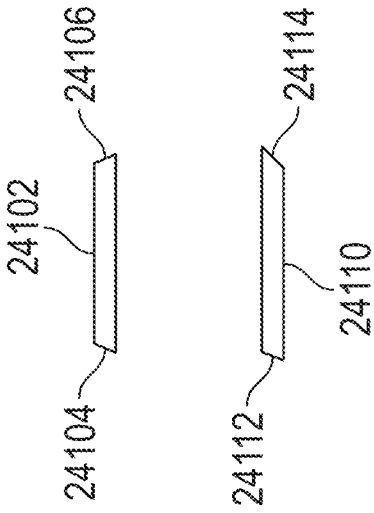
FIG. 24A illustrates side views of two different types of screen elements that can be joined to form a screen assembly with peaks or undulations.

FIG. 24A shows end edges of two screen elements 24102 and 24110. The screen elements have angled side edges. The angled side edges allow the screen elements 24102 and 24110 to be joined together to form a screen assembly that has pointed protrusions or undulations.

The first screen element 24102 has first and second side edges 24104 and 24106 that slope outward and downward from the top surface such that the bottom surface has a greater width than the top surface. This first type of screen element 24102 will end up forming the flat portions of a screen assembly, as described below.

The second screen element 24110 also has angled side edges 24112, 24114. The second screen element 24110 will form the upwardly or downwardly protruding portions of a screen assembly, as described below. The angles formed between the side edges 24112, 24114 and the top and bottom surfaces of the screen element 24110 will depend on the desired shape of the screen assembly that is formed with this type of screen element 24110.

Figure 24B:
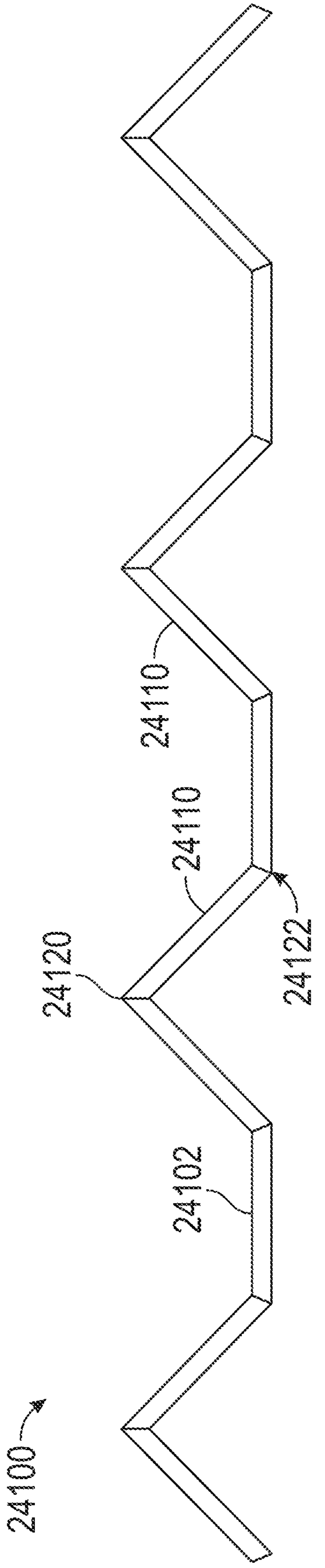
FIG. 24B illustrates multiple screen elements as depicted in FIG. 24A after they have been joined to form a screen assembly having peaks.

FIG. 24B is a side view of a screen assembly 24100 formed with a plurality of screen elements 24102, 24110 as depicted in FIG. 24A. As shown in FIG. 24B, the opposite side edges 24104, 24106 of each of the first type of screen element 24102 form the flat portions of the screen assembly 24100 between the protruding portions. Two of the second type of screen element 24110 form each protruding portion between the flat portions of the screen assembly 24100 formed by the first type of screen element 24102. The first side edge 24112 of each of the second type of screen elements 24110 are joined to a side edge of a first type of screen element 24102. The second side edges 24114 of each second type of screen element 24110 are joined together to form the peaks 24120 of each protrusion of the screen assembly 24100.

As is apparent from the depiction in FIG. 24B, the angles of the side edges of the first and second types of screen elements 24102, 24110 can be varied so that the protrusions project upwardly from the flat portions at different angles and heights.

The joining of the side edges of the screen elements that form a screen assembly 24100 as depicted in FIG. 24B could be accomplished by methods similar to those discussed above. In some instances it may be helpful to lay the screen elements on top of a shaped assembly jig that has a shape similar to the desired final form of the screen assembly. Once the screen elements are resting on the shaped assembly jig so that they form a shape as depicted in FIG. 24B, the side edges can be joined together via a heating and fusing process as described above. The joining process could include interposing one or more reinforcing fibers between the side edges of the screen elements. Of course, the side edges could also be joined via alternate means, such as with adhesives or mechanical fasteners.

Figure 25:
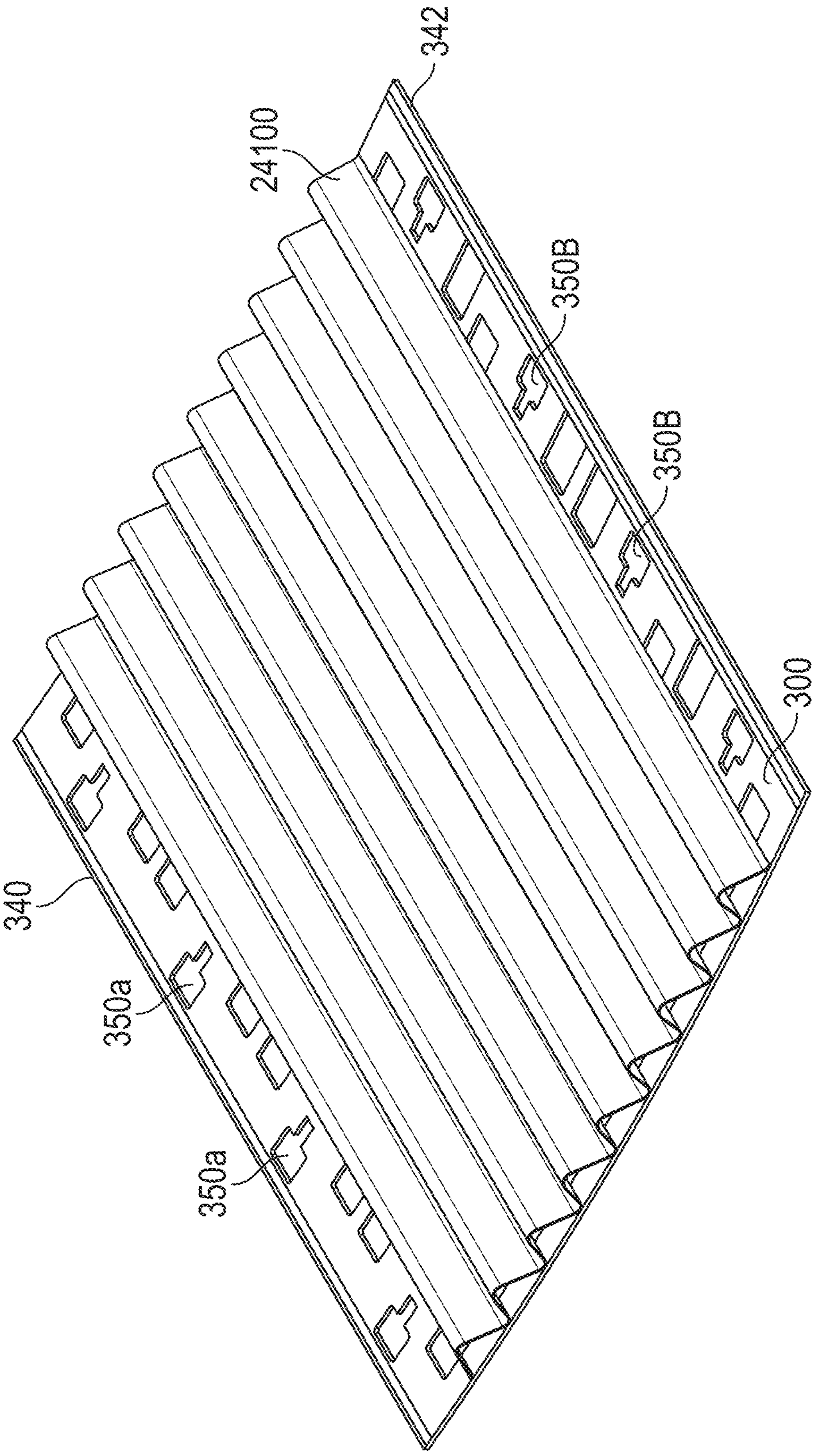
FIG. 25 is a perspective view of a screen assembly that includes a support plate and a screening layer of joined screen elements that is formed to have undulations.

FIG. 25 depicts another embodiment of a screen assembly that includes a flat support plate 300 like the one illustrated in FIG. 21. In this embodiment, however, the screening layer 24100 is formed so that it has undulations, such as the one depicted in FIG. 24B. This would mean that angled side edges of the screen elements are joined together such that the resulting screen assembly has ridges or protrusions.

In alternate embodiments, a flat layer of screen elements can be joined together as described above. Once the side edges of the screen elements are joined together, the layer of joined screen elements could be inserted into a shaped mold having the desired undulations and the material of the screen elements could be heated to near the melting point. By heating the material of the screen elements and applying pressure to the assembly with a shaped mold, one could cause the screen assembly to take on an undulating shape similar to the one depicted in FIG. 24.

A damaged screen assembly made as described above could also be repaired by covering over the damaged section. For example, a flat piece of thermoplastic material without apertures could be bonded or fused into place over a damaged section of the screen assembly. Alternatively, the patch could include screening openings. In either event, because the material of the existing screen elements of the screen assembly can be remelted after the screen assembly is formed, it is possible to patch a damaged section of the screen assembly by fusing a patch into place over the damaged section via a heating operation. Of course, adhesives could also be used to bond the patch into place over a damaged section.

Previous methods of joining injection molded screen elements together to form a screen assembly have relied upon the use of subgrids which can be attached together to form the screen assembly. See, for example, U.S. Pat. Nos. 10,046,363; 9,409,209; 10,576,502 and 11,161,150, the contents of all of which are incorporated herein by reference. The screen assemblies disclosed in the listed patents include injection molded screen elements that are mounted on subgrids. The subgrids are then attached to each other with integral fasteners to form screen assemblies.

The apparatus and methods described above, where side edges of injection molded screen elements are fastened together via bonding, fusing or other attachment methods result in a screen assembly that does not require subgrids. Creating a screen assembly by bonding the side edges of screen elements together without the use of subgrids provide numerous benefits.

First, there is no need to manufacture the subgrids, which is a large savings in terms of time and cost. Second, there is no need to spend time and effort attaching the screen elements to subgrids before the screen assembly is created. Instead, as soon as the screen elements have been formed they can immediately be attached to each other via the methods described above to form screen assemblies.

In addition, by eliminating the subgrids the resulting screen assembly is thinner, lighter and more flexible. This makes transportation and shipping easier and less expensive. In some cases, this may also make it easier to install the screen assemblies onto screening machines.

Moreover, the joining methods described above, where the side edges of injection molded screen elements are fused together can result in screen assemblies that have greater strength in tension than screen assemblies that are held together via the fasteners of the subgrids. The ability to add reinforcement fibers to the screen assembly, as described above, can add to that tensile strength. It would have been impossible, or at least very difficult, to add reinforcement fibers to a screen assembly formed using subgrids.

One of the drawbacks of screen assemblies formed using the subgrids was that the integral fasteners used to attach the subgrids together did not ensure that the resulting assembly was free of gaps between the individual elements. The side edges of the screen elements mounted on top of the subgrids were not bonded together. As a result, it was possible for material being screened to fall down between the side edges of the screen elements. Likewise, the subgrids themselves were attached together using integral clip fasteners, but the side edges between the subgrids were not sealed up. As a result, any material that falls down between the side edges of two adjacent screen elements could likewise fall down between the side edges of the subgrids upon which the screen elements are mounted. All of these factors could cause problems with material bypassing the screen elements and falling between the individual elements that make up a screen assembly formed with subgrids.

The problem of material bypassing the screen elements is particularly acute when the screen elements are configured with very small apertures to allow only very small particles to pass through the screens. Unfortunately, gaps between adjacent screen elements and between adjacent subgrids could have sized similar to or larger than the screening openings in the screen elements. This would allow particles that are larger than the screening openings to bypass the screen elements, which is problematic.

All of the above-discussed problems with particles bypassing the screen elements are solved by a screen assembly formed as discussed above because the side edges of the screen elements are bonded or fused together. There are no gaps between screen elements. And because there are no subgrids, there are no corresponding gaps between sides of the subgrids.

In addition, it appears that under some circumstances, the existence of subgrids hinders screening performance. The subgrids hinder movement of the screening surface when under vibration. When the screen elements are not connected to an underlying subgrid, they are more free to move, and they can be moved more rapidly due to the lack of mass associated with the subgrids. Screen elements without subgrids may also move greater distances in each direction under vibration than would be possible with the screen elements are attached to subgrids. All these factors result in a screen assembly being formed of only the screen elements having better overall screening performance than screen elements attached to subgrids.

Screen assemblies that are formed from a plurality of injection molded screen elements as described above have many advantages over screen assemblies formed by casting thermoset materials. As discussed above, it takes far longer to cure a screen assembly via casting of thermoset materials than it would to injection mold a plurality of screen elements and attached them together to form a screen assembly, as described above. The casting of thermoset materials takes hours, sometimes as many as 10 hours, to form a single large screen assembly. In contrast, individual screen elements can be injection molded in seconds, and the time required to injection mold a sufficient number of screen elements to make large screen is still less than an hour. The additional time required to join the injection molded screen elements to form a screen assembly still is nowhere near as long as required to wait for thermoset materials to cure.

In addition, the size of a screen assembly formed by curing thermoset materials in a mold is limited by the size of the mold. In contrast, one can create a screen assembly from a plurality of injection molded screen elements to have virtually any dimensions whatsoever. There are no size limitations imposed by mold sizes.

There are also advantages in terms of waste or scrap. If a single small portion of a screen assembly made via casting of thermoset materials is deformed, or a single small portion of a screen assembly formed by casting thermoset materials is damaged when it is removed from the mold, the entire screen assembly is scrap. And the time required to make the screen assembly is lost. In contrast, if a single small injection molded screen element is deformed, only the small screen element is scrap. And because it is made of thermoplastic, it can be remelted and reused to form a new screen element. The only time lost is the very short time that it took to make the defective injection molded screen element. Because of these factors, the waste in terms of time and scrap when things go wrong is much smaller with injection molded screen elements as compared to casting screen assemblies from thermoset materials.

The disclosed embodiments may be configured for use with various different vibratory screening machines. This includes machines designed for wet and dry screening applications, machines having multi-tiered decks and/or multiple screening baskets, and machines having various screen attachment arrangements such as tensioning mechanisms (under and overmount), compression mechanisms, clamping mechanisms, magnetic mechanisms, etc. For example, the screen assemblies described in the present application may be configured to be mounted on the vibratory screening machines described in U.S. Pat. Nos. 7,578,394; 5,332,101; 6,669,027; 6,431,366; and 6,820,748.

Indeed, the screen assemblies described herein may include side portions, binder bars and hook strips that include U-shaped members configured to receive overmount type tensioning members, e.g., as described in U.S. Pat. No. 5,332,101; side portions or binder bars including finger receiving apertures configured to receive undermount type tensioning, e.g., as described in U.S. Pat. No. 6,669,027; side members or binder bars for compression loading, e.g., as described in U.S. Pat. No. 7,578,394; or may be configured for attachment and loading on multi-tiered machines, e.g., such as the machines described in U.S. Pat. No. 6,431,366. The screen assemblies and/or screen elements also may be configured to include features described in U.S. Pat. No. 8,443,984, including the guide assembly technologies described therein and preformed panel technologies described therein.

Still further, the screen assemblies and screen elements may be configured to be incorporated into the prescreening technologies (e.g., compatible with the mounting structures and screen configurations) described in U.S. Pat. Nos. 8,439,203; 7,578,394; 5,332,101; 4,882,054; 4,857,176; 6,669,027; 7,228,971; 6,431,366; and 6,820,748; 8,443,984; and 8,439,203; which, along with their related patent families and applications, and the patents and patent applications referenced in these documents, are expressly incorporated herein by reference hereto. In the foregoing, example embodiments are described. It will, however, be evident that various modifications and changes may be made thereunto without departing from the broader spirit and scope hereof. The specification and drawings are accordingly to be regarded in an illustrative rather than in a restrictive sense.

What is claimed is:

1. A method of forming a screen assembly, comprising:

providing a plurality of screen elements that are formed from a thermoplastic material, each screen element having a screening surface with a plurality of screening openings separated by screen surface elements;

attaching the plurality of screen elements to each other to form a screen assembly that includes a continuous screening surface comprised of the screening surfaces of the plurality of screen elements, wherein the plurality of screen elements are attached to each other by directly affixing adjacent side edges of the screen elements to each other; and causing at least one reinforcement fibers to become attached to at least some of the screen elements after or while the screen elements are attached to each other.

2. The method of claim 1, wherein directly affixing adjacent side edges of the screen elements to each other comprises causing material along adjacent side edges of the plurality of screen elements to fuse together.

3. The method of claim 1, wherein causing at least one reinforcement fibers to become attached to at least some of the screen elements comprises causing the at least one reinforcement fibers to become trapped between the adjacent side edges of the selected ones of the screen elements when they fuse together such that the at least one reinforcement fibers becomes embedded in the material of at least some of the screen elements.

4. The method of claim 1, wherein directly affixing adjacent side edges of the screen elements to each other comprises directly affixing adjacent side edges of the screen elements to each other with an adhesive.

5. The method of claim 4, wherein causing at least one reinforcement fibers to become attached to at least some of the screen elements comprises locating the at least one reinforcement fibers between the adjacent side edges of selected ones of the screen elements before they are directly affixed to each other with an adhesive such that once the adjacent side edges of the selected ones of the screen elements are directly affixed to each other the at least one reinforcement fibers becomes trapped between the adjacent side edges of the selected ones of the screen elements.

6. The method of claim 1, wherein providing a plurality of screen elements comprises providing screen element in which:

a width of each screening opening between adjacent screen surface elements is between approximately 10 μm and approximately 6000 μm;

a thickness of each screen surface element between adjacent screening openings is between approximately 10 μm and approximately 4000 μm; and an open screening area of the screen element is between approximately 15% and approximately 40% of the total area of the screen element.

7. The method of claim 1, wherein providing a plurality of screen elements comprises providing screen elements in which:

a width of each screening opening between adjacent screen surface elements is between approximately 25 μm and approximately 2000 μm;

a thickness of each screen surface element between adjacent screening openings is between approximately 50 μm and approximately 150 μm; and an open screening area of the screen element is between approximately 15% and approximately 40% of the total area of the screen element.

8. The method of claim 1, wherein causing at least one reinforcement fiber to become attached to at least some of the screen elements comprises attaching the at least one reinforcement fiber to at least some of the screen elements with an adhesive.

9. The method of claim 1, wherein directly affixing adjacent side edges of the screen elements to each other and causing at least one reinforcement fibers to become attached to at least some of the screen elements comprises:

attaching subsets of the plurality of screen elements together, end-to-end, to form a plurality of strips of joined screen elements;

heating side edges of the strips of joined screen elements to cause material of the strips of joined screen elements along the side edges to begin to melt or to change from a solid state to a liquid state;

positioning the at least one reinforcement fibers between side edges of two adjacent strips of joined screen elements;

bringing the adjacent side edges of the strips of joined screen elements together after the material of the screen elements along the adjacent side edges has begun to melt or to change from a solid state to a liquid state and after the at least one reinforcement fibers has been positioned between the adjacent side edges such that the at least one reinforcement fibers is trapped between the side edges of two adjacent strips of joined screen elements; and holding the strips of joined screen elements together as the material of the screen elements along the adjacent side edges cools and returns to a solid state and such that the material of the strips of screen elements along the adjacent side edges fuses together and encapsulates the at least one reinforcement fibers.

10. The method of claim 1, wherein causing the at least one reinforcement fibers to become attached to at least some of the screen elements comprises:

heating the material of selected portions of selected ones of the screen elements so that the material begins to melt or to change from a solid state to a liquid state after the plurality of screen elements have been attached to each other;

causing the at least one reinforcement fibers to enter the material of the selected portions of the selected ones of the screen elements while the material is melted or in a liquid or semi-liquid state; and allowing the material of the selected portions of the selected ones of the screen elements to cool so that the material returns to a solid state and such that the at least one reinforcement fibers becomes embedded in the material of the selected portions of the selected ones of the screen elements.

11. The method of claim 1, wherein the screen assembly includes first and second side edges and first and second end edges, the method further comprising attaching at least one hook strip to at least one of the first and second end edges, wherein the at least one hook strip is configured to secure the screen assembly to a screening machine.

12. The method of claim 11, further comprising attaching the at least one reinforcement fibers to the at least one hook strip.

13. The method of claim 1, wherein at least one reinforcement groove is provided on a back side of at least some of the screen elements, and wherein attaching the at least one reinforcement fibers to at least some of the screen elements comprises attaching the at least one reinforcement fibers to the reinforcement grooves of at least some of the screen elements.

14. A screen assembly for use on a screening machine, comprising:

a plurality of screen elements made from a thermoplastic material, each screen element having a screening surface with a plurality of screening openings separated by screen surface elements, wherein adjacent side edges of the plurality of screen elements are directly attached to each other to form a screen assembly that has a continuous screening surface comprised of the screening surfaces of the plurality of screen elements; and at least one reinforcement fibers that was attached to selected ones of the plurality of screen elements after or while the screen elements were affixed to each other.

15. The screen assembly of claim 14, wherein the adjacent side edges of the plurality of screen elements were directly attached to each other by causing the material of the adjacent side edges of the screen elements to fuse together.

16. The screen assembly of claim 15, wherein the at least one reinforcement fibers was positioned between adjacent side edges of selected ones of the screen elements when the material of the adjacent side edges of the selected ones of the screen elements were caused to fuse together such that the at least one reinforcement fiber became embedded in the material of the selected ones of the screen elements along the adjacent side edges.

17. The screen assembly of claim 14, wherein the at least one reinforcement fibers is embedded in the material of selected ones of the plurality of screen elements.

18. The screen assembly of claim 14, wherein the at least one reinforcement fibers is embedded in the material of selected ones of the plurality of screen elements such that the at least one reinforcement fibers is positioned between top and bottom surfaces of the selected ones of the screen elements.

19. The screen assembly of claim 14, wherein the adjacent side edges of the plurality of screen elements are attached to each other with an adhesive.

20. The screen assembly of claim 14, wherein the at least one reinforcement fibers is attached to selected ones of the plurality of screen elements with an adhesive.

21. The screen assembly of claim 14, wherein each of the plurality of screen elements includes a reinforcement portion in which no screening openings are present, and wherein the at least one reinforcement fibers is attached to the reinforcement portions of at least some of the plurality of screen elements.

22. The screen assembly of claim 14, wherein for each of the plurality of screen elements:

a width of each screening opening between adjacent screen surface elements is between approximately 10 μm and approximately 6000 μm;

a thickness of each screen surface element between adjacent screening openings is between approximately 10 μm and approximately 4000 μm; and an open screening area of the screen element is between approximately 15% and approximately 40% of the total area of the screen element.

23. The screen assembly of claim 14, wherein for each of the plurality of screen elements:

a width of each screening opening between adjacent screen surface elements is between approximately 25 μm and approximately 2000 μm;

a thickness of each screen surface element between adjacent screening openings is between approximately 50 μm and approximately 150 μm; and an open screening area of the screen element is between approximately 15% and approximately 40% of the total area of the screen element.

24. The screen assembly of claim 14, wherein for each of the plurality of screen elements:

a width of each screening opening between adjacent screen surface elements is between approximately 10 μm and approximately 125 μm;

a thickness of each screen surface element between adjacent screening openings is between approximately 60 μm and approximately 127 μm; and an open screening area of the screen element is between approximately 15% and approximately 40% of the total area of the screen element.

25. A screen assembly for use on a screening machine, comprising:

a plurality of injection molded screen elements made from a thermoplastic material, each screen element having a screening surface with a plurality of screening openings separated by screen surface elements, wherein adjacent side edges of the plurality of screen elements are directly coupled to each other to form a screen assembly that has a continuous screening surface comprised of the screening surfaces of the plurality of screen elements, and wherein for each of the screen elements:

a width of each screening opening between adjacent screen surface elements is between approximately 10 μm and approximately 6000 μm;

a thickness of each screen surface element between adjacent screening openings is between approximately 10 μm and approximately 4000 μm; and an open screening area of the screen element is between approximately 15% and approximately 40% of the total area of the screen element; and at least one reinforcement fibers that was attached to at least some of the screen elements after or while the screen elements were directly coupled to each other to form the screen assembly.

26. The screen assembly of claim 25, wherein the adjacent side edges of the screen elements are coupled to each other by causing the material of the adjacent side edges of the screen elements to fuse together.

27. The screen assembly of claim 25, wherein the at least one reinforcement fibers was attached to at least some of the plurality of screen elements by causing the at least one reinforcement fibers to become embedded in the material of at least some of the plurality of screen elements.

28. The screen assembly of claim 25, wherein the adjacent side edges of the screen elements are coupled to each other by an adhesive.

29. The screen assembly of claim 25, wherein the at least one reinforcement fibers was attached to at least some of the plurality of screen elements by an adhesive.

30. The screen assembly of claim 25, wherein the at least one reinforcement fibers extends across the screen assembly in a direction in which the screen assembly will be tensioned to secure the screen assembly to a screening machine.

31. The screen assembly of claim 25, wherein each of the plurality of screen elements includes a reinforcement section in which no screening openings are present, and wherein the at least one reinforcement fibers is attached to the reinforcement sections of at least some of the plurality of screen elements.

32. The screen assembly of claim 25, wherein each of the plurality of screen elements includes a reinforcement section in which no screening openings are present, and wherein the at least one reinforcement fibers is embedded in the material of the reinforcement sections of at least some of the plurality of screen elements.

* * * * *